(12) United States Patent
Sakamoto

(10) Patent No.: US 9,804,370 B2
(45) Date of Patent: Oct. 31, 2017

(54) ZOOM LENS SYSTEM

(71) Applicant: CANON KABUSHIKI KAISHA, Tokyo (JP)

(72) Inventor: Masaru Sakamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/091,463

(22) Filed: Apr. 5, 2016

(65) Prior Publication Data
US 2016/0299323 A1    Oct. 13, 2016

(30) Foreign Application Priority Data
Apr. 10, 2015  (JP) .................. 2015-081063

(51) Int. Cl.
*G02B 15/173* (2006.01)
*G02B 13/00* (2006.01)
*G02B 27/00* (2006.01)

(52) U.S. Cl.
CPC ......... *G02B 15/173* (2013.01); *G02B 13/009* (2013.01); *G02B 27/0062* (2013.01)

(58) Field of Classification Search
CPC ...... G02B 13/009; G02B 15/15; G02B 15/16; G02B 15/167; G02B 15/173
USPC .......... 359/676, 686, 687, 689, 690
See application file for complete search history.

(56) References Cited

U.S. PATENT DOCUMENTS 6,002,528 A * 12/1999 Tomita ............... G02B 15/173
                                                     359/684
2013/0271630 A1* 10/2013 Nakamura ............ G02B 15/14
                                                     348/294
2015/0362711 A1* 12/2015 Wakazono ............ G02B 15/16
                                                     359/684

FOREIGN PATENT DOCUMENTS

JP    2001-183584 A    7/2001

* cited by examiner

*Primary Examiner* — Darryl J Collins
(74) *Attorney, Agent, or Firm* — Canon USA Inc., IP Division

(57) ABSTRACT

A zoom lens system including, in order from an object side to an image side, a first lens unit having a positive refractive power that does not move for zooming, a second lens unit having a negative refractive power that moves during zooming, and a third lens unit having a positive refractive power that moves during zooming. In the zoom lens system, a distance between lens units that are adjacent to each other changes during zooming, the first lens unit includes a first a-lens unit that does not move for focusing, and a first b-lens unit that moves from the image side towards the object side during focusing from an infinite object to a near object, and the first a-lens unit comprises two positive lenses and two negative lenses.

8 Claims, 16 Drawing Sheets

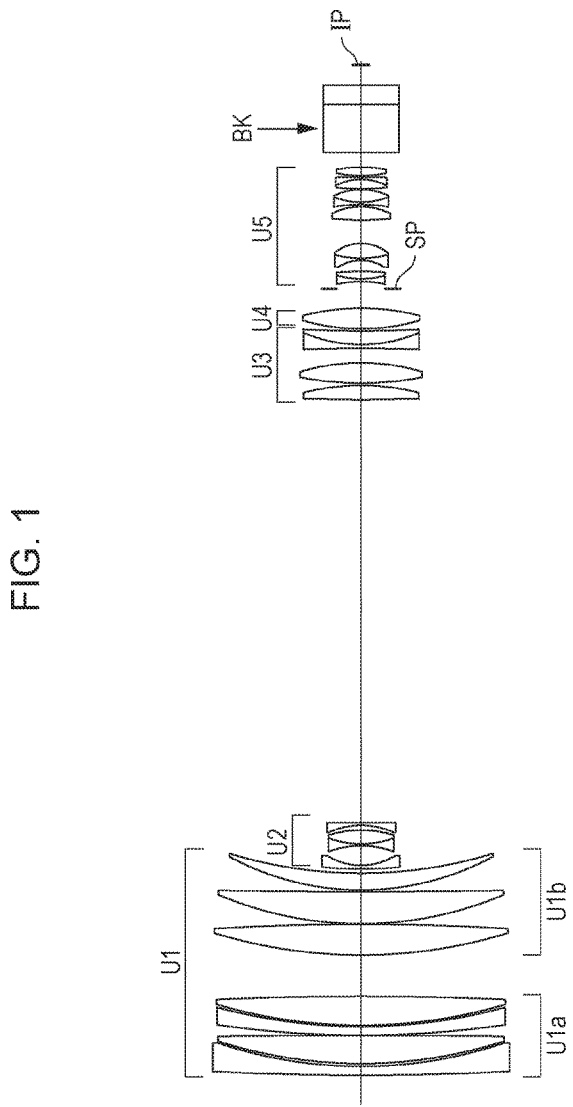

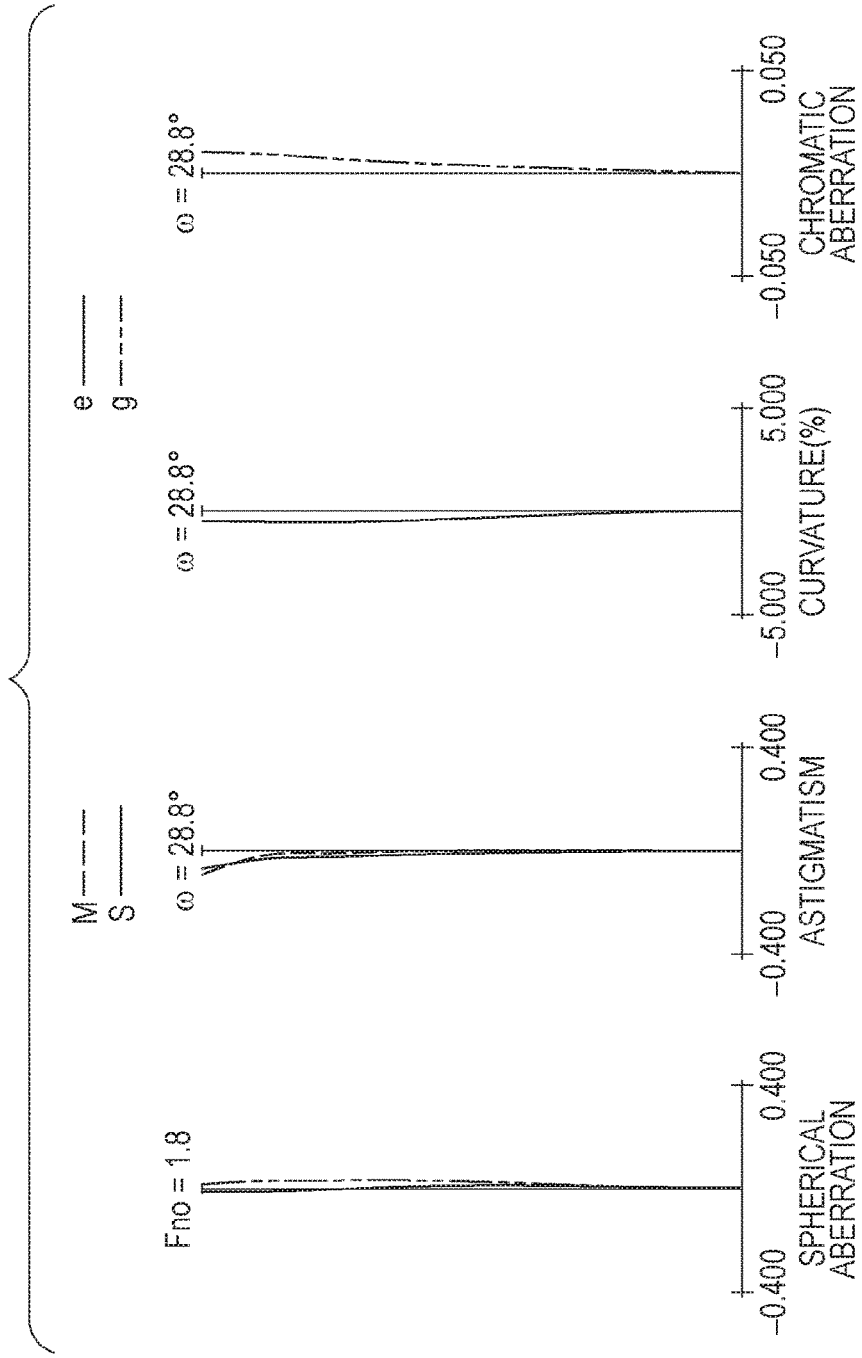

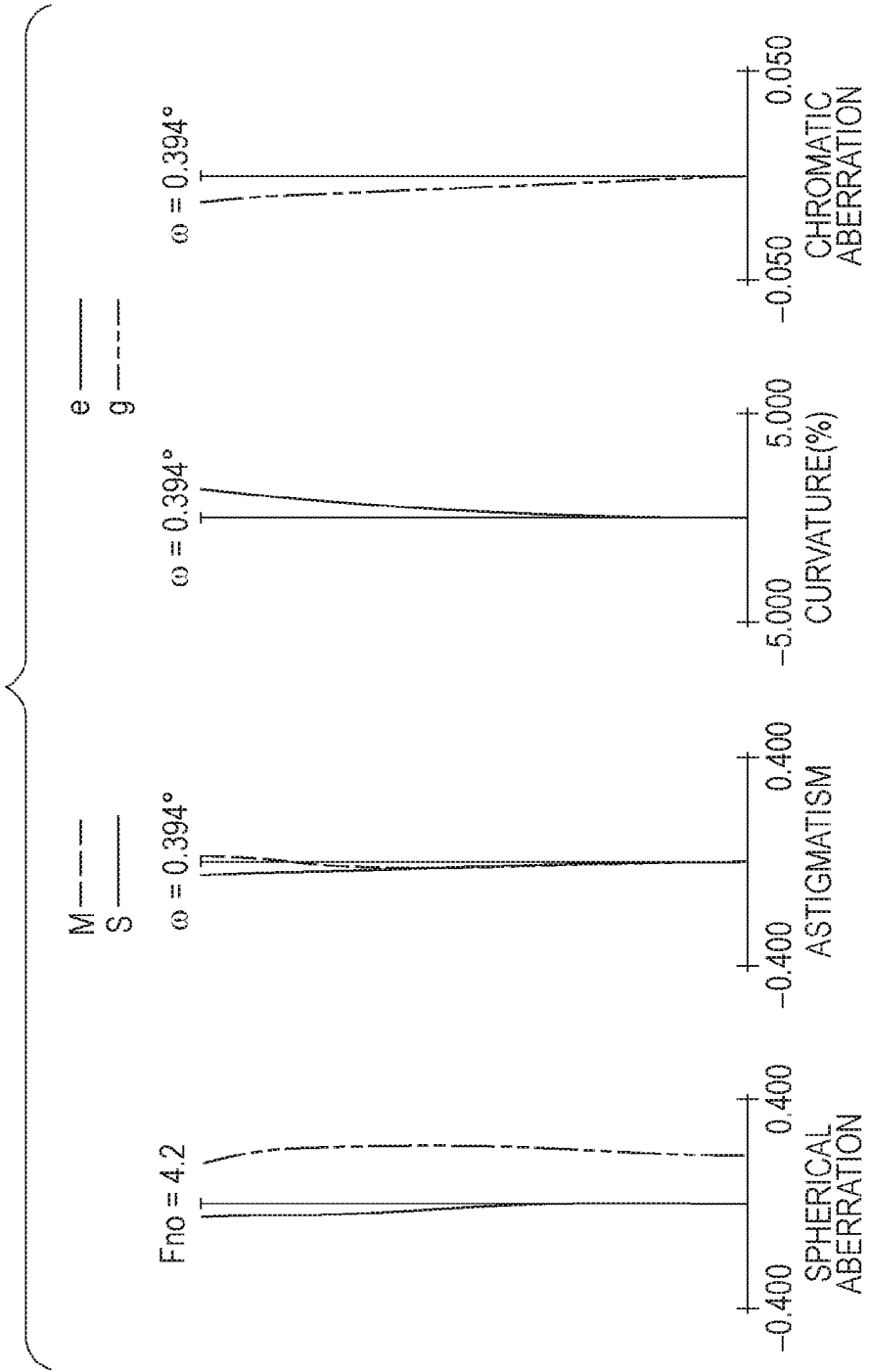

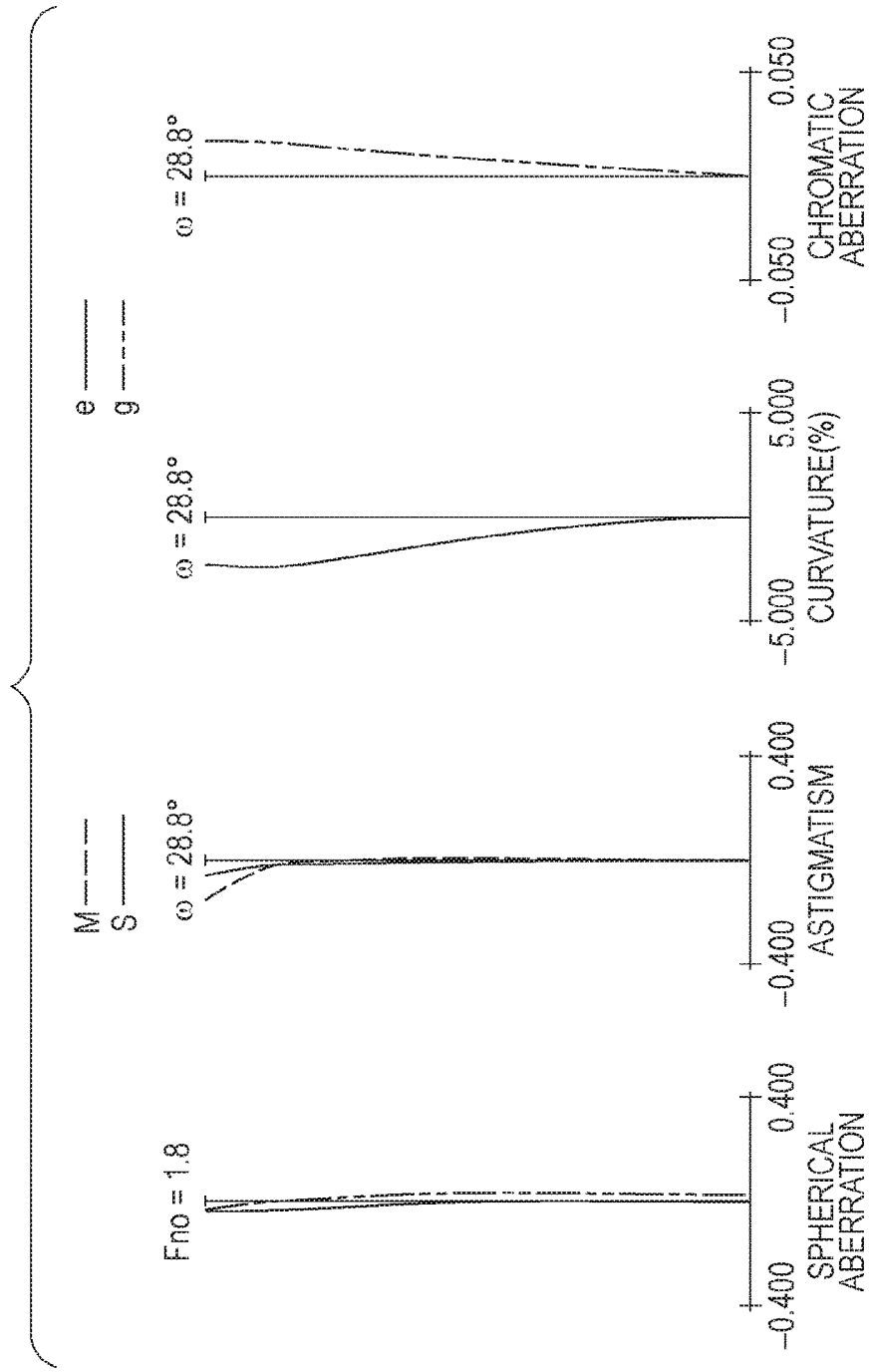

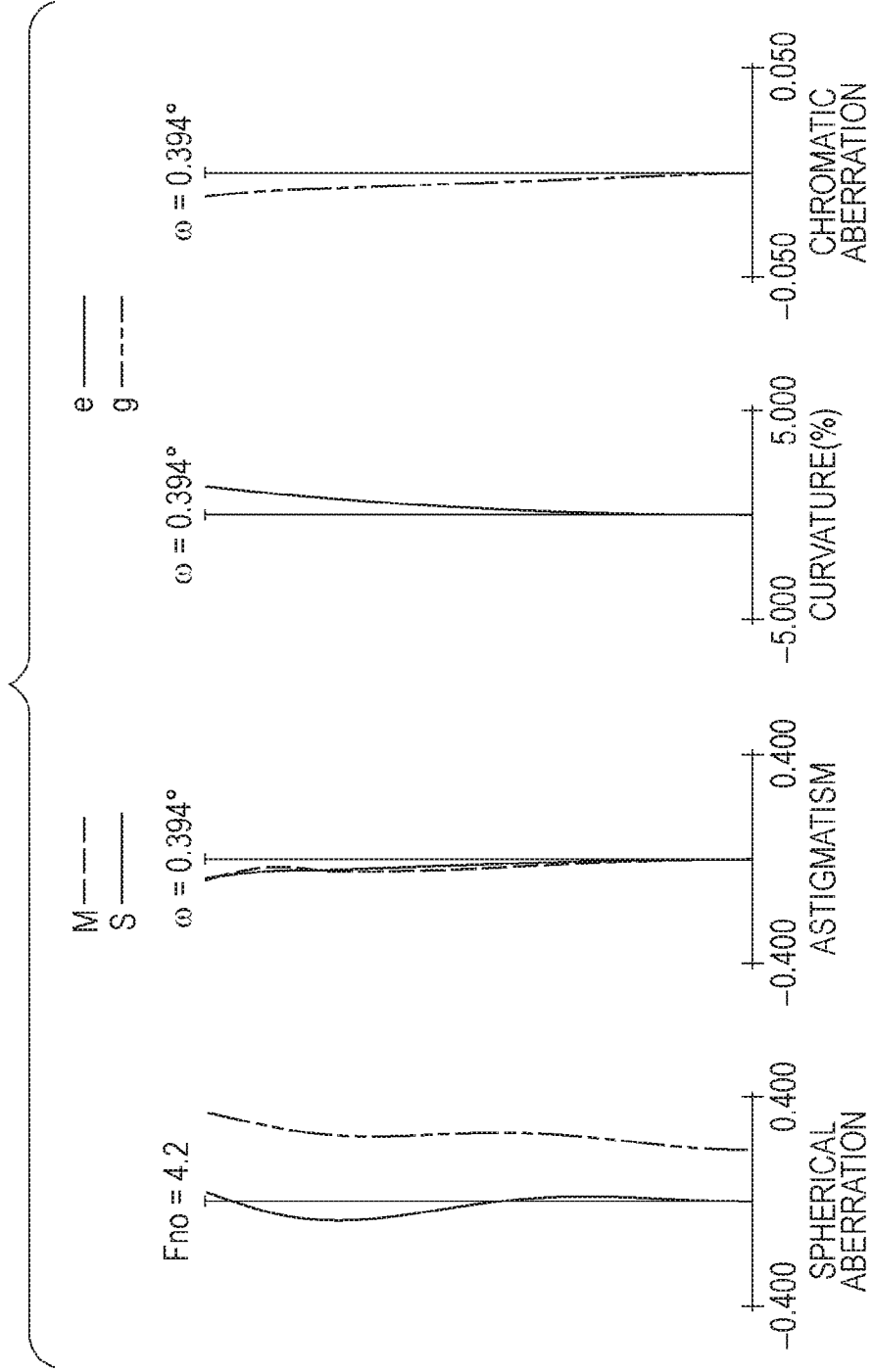

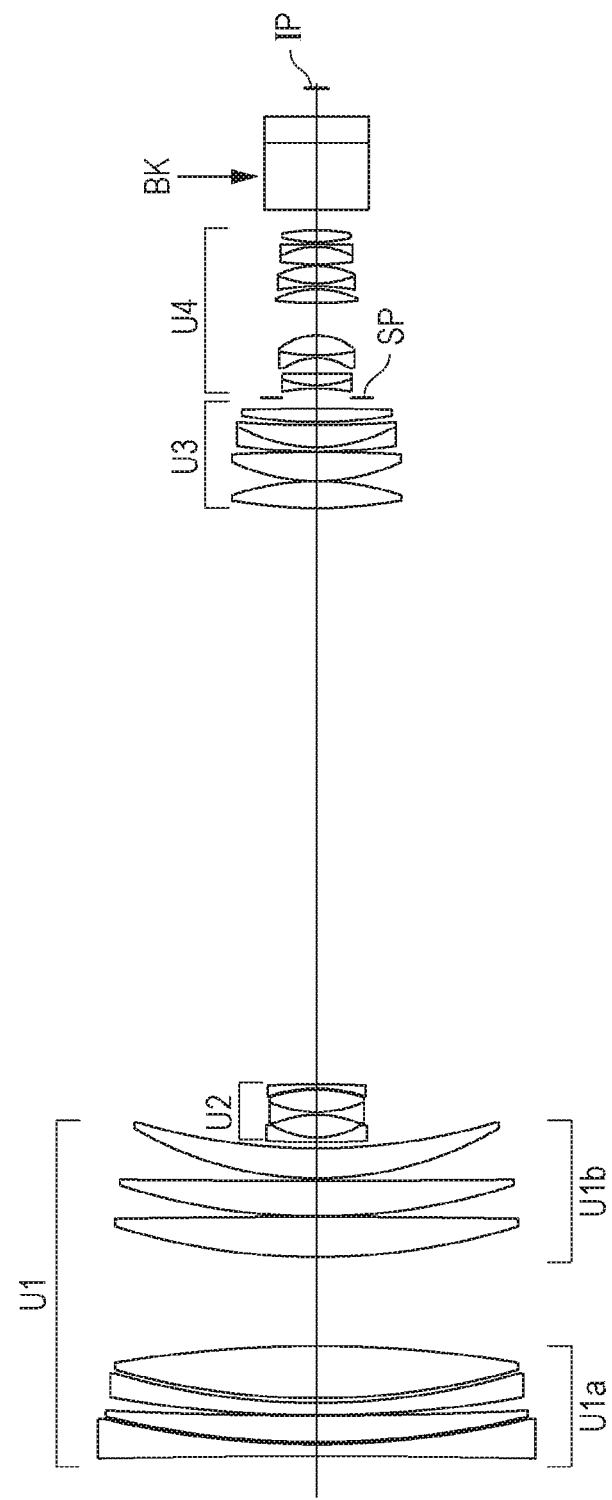

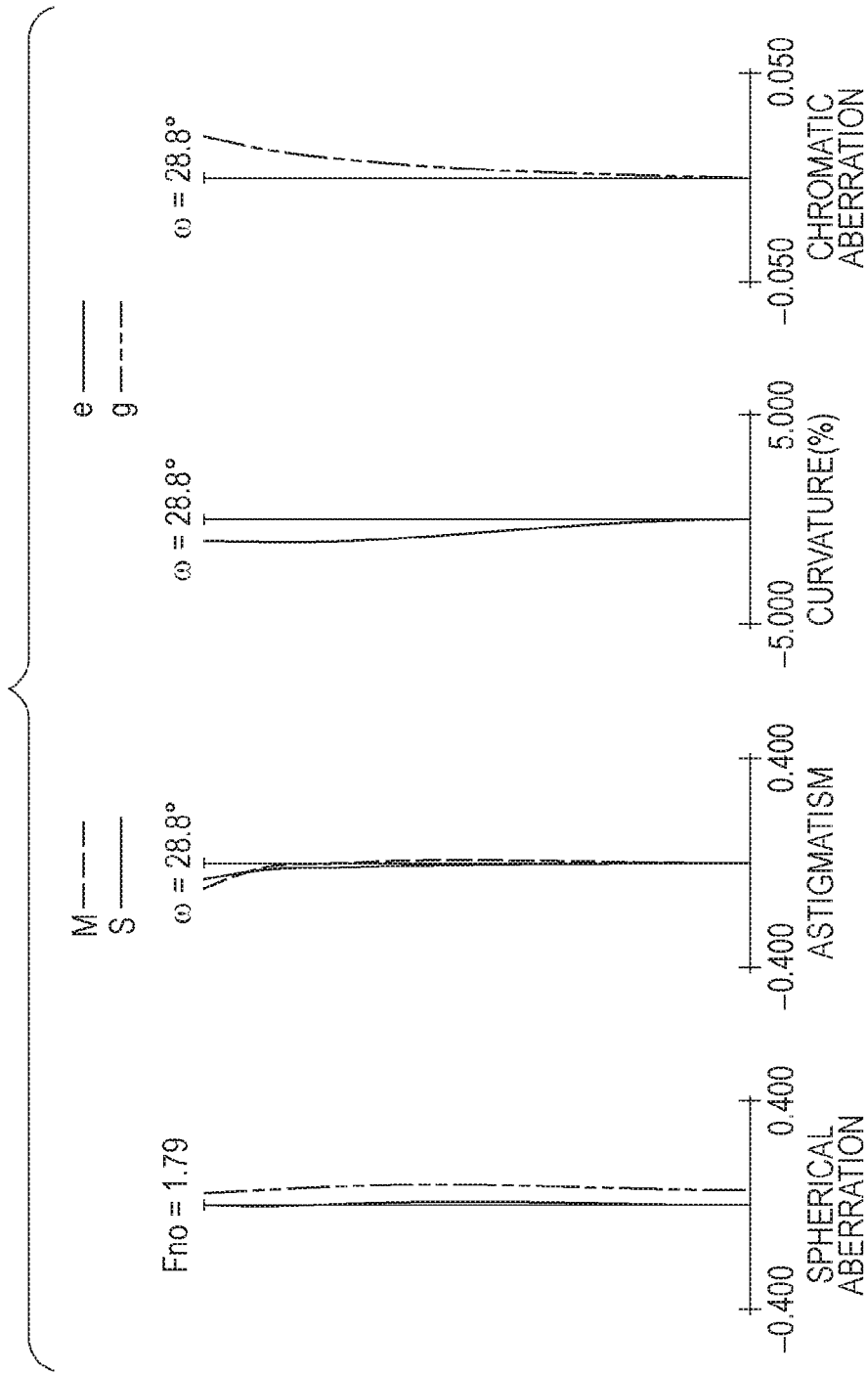

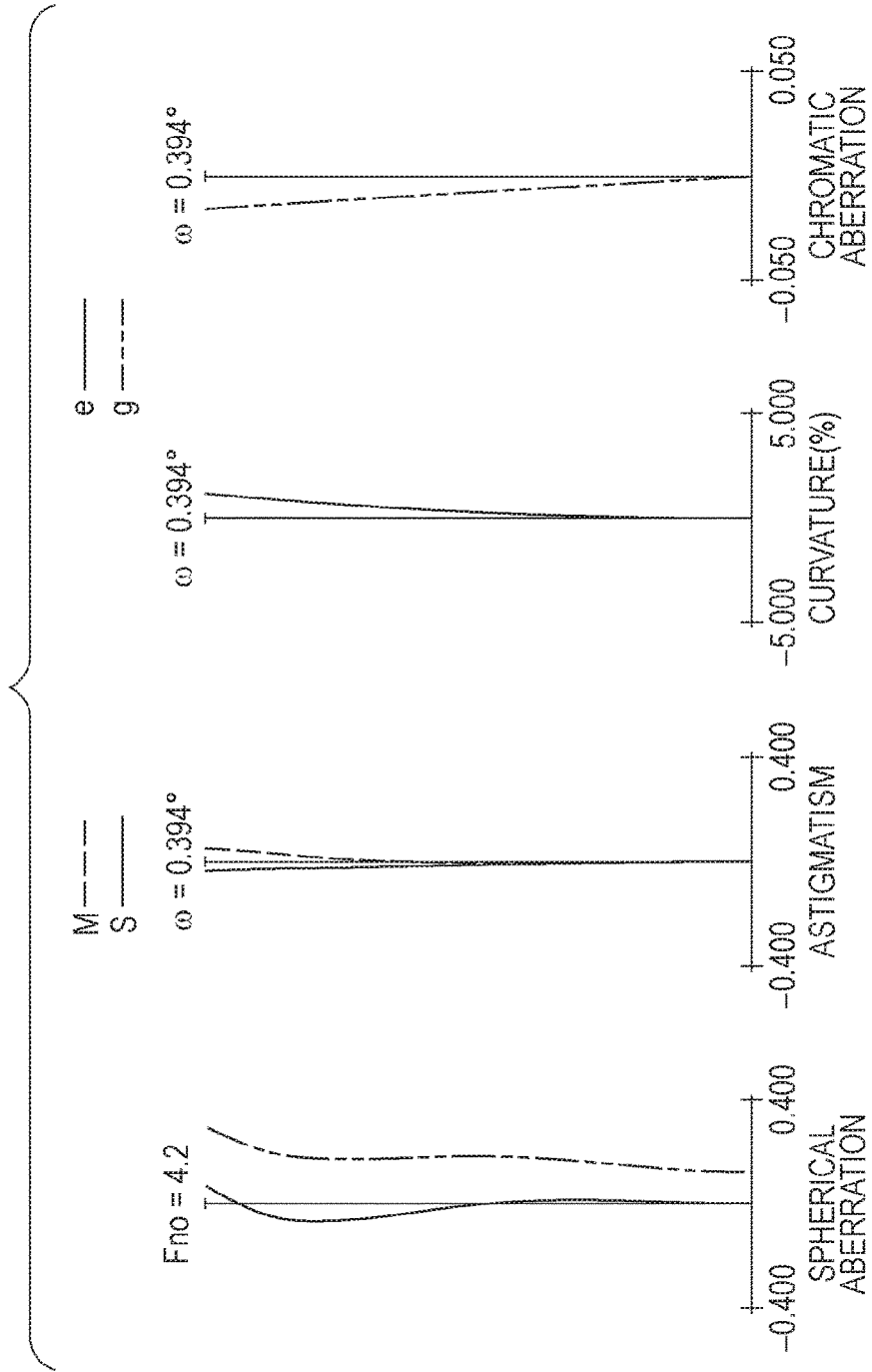

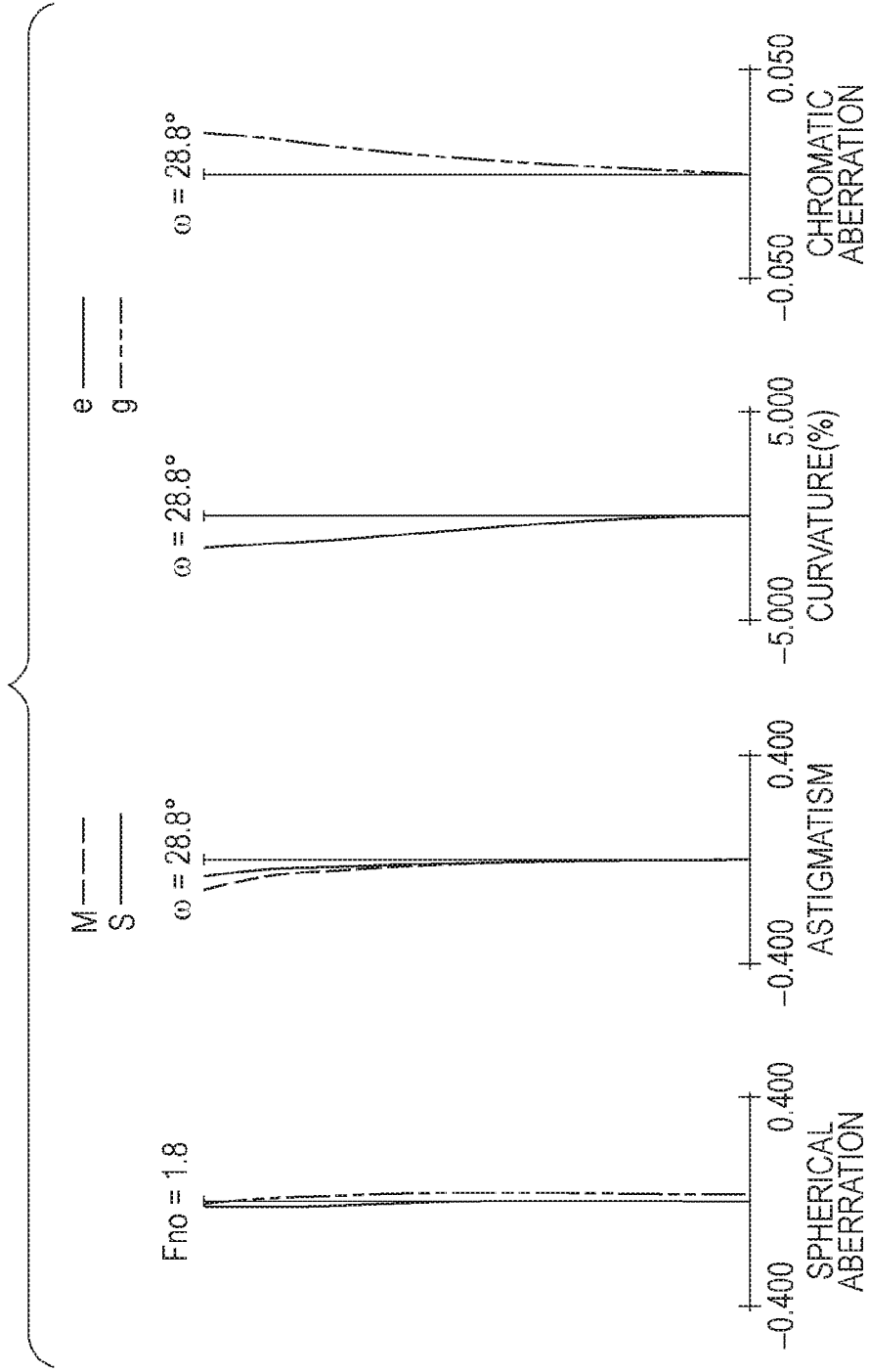

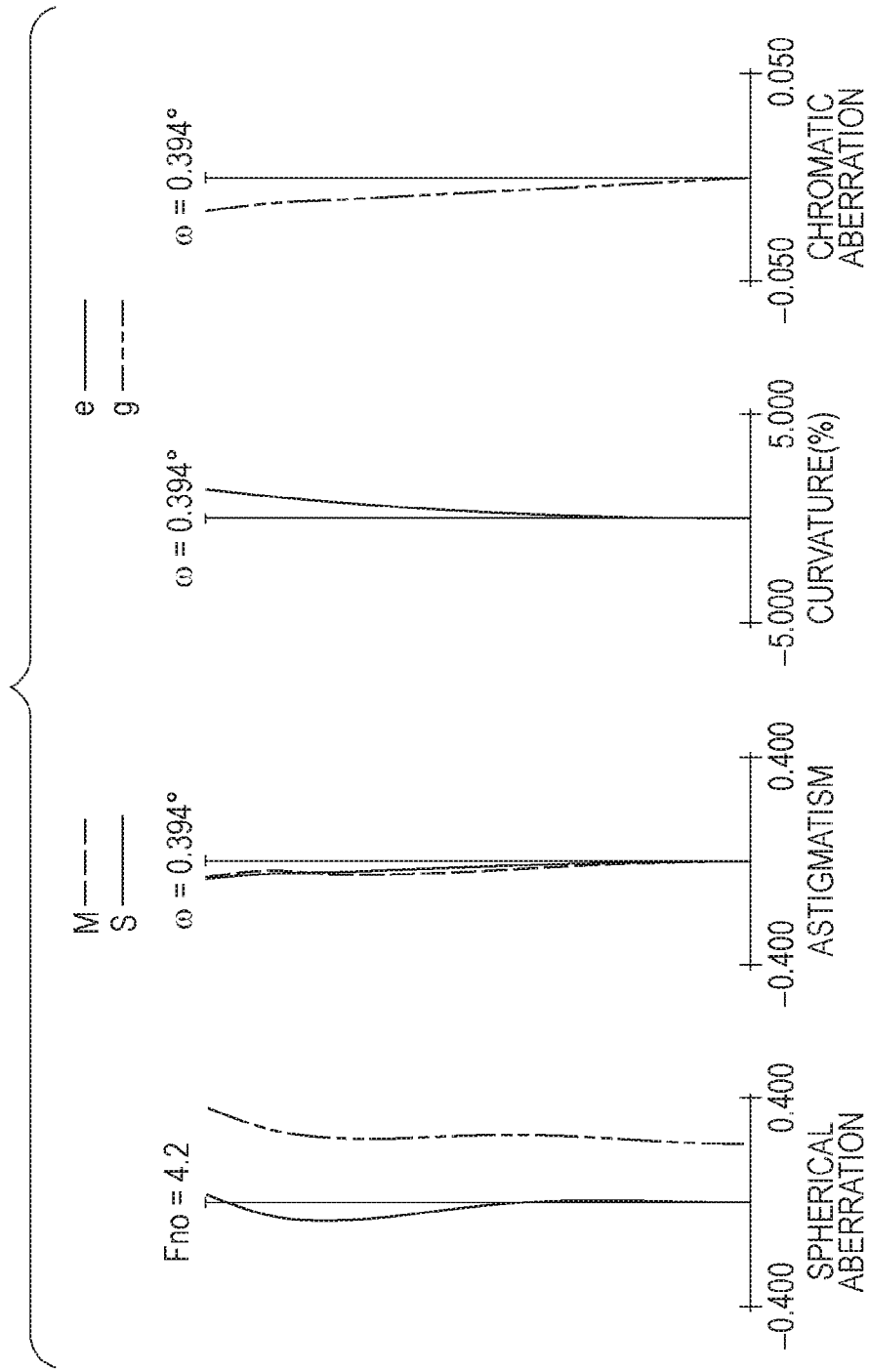

ZOOM LENS SYSTEM

BACKGROUND OF THE INVENTION

Field of the Invention

The present disclosure relates to a zoom lens system and an image capturing apparatus including the same, and is suitable for, for example, a television camera for broadcasting, a video camera, a digital still camera, a monitoring camera, a film camera.

Description of Related Art

In recent years, in image capturing apparatuses, such as television cameras, silver halide film cameras, digital cameras, and video cameras, there is a demand for a zoom lens system that has a wide view angle and a high zoom ratio, and, moreover, with a high optical performance.

For example, Japanese Patent Laid-Open No. 2001-183584 discloses a four-unit zoom lens system that is suitable for television cameras and that includes, from the object side to the image side, a positive first lens unit, a second lens unit having a negative refractive power that moves during zooming, a third lens unit having a positive refractive power, and a fourth lens unit that does not move for zooming. Furthermore, a segmental lens unit on the most image side of the first optical unit performs focusing while a segmental lens unit on the object side of the first optical unit is fixed during focusing.

The above Japanese Patent Laid-Open No. 2001-183584 discloses a zoom lens system that has a zoom ratio of about 65 times and an angle of view for shooting of about 60° at a wide angle end, and that achieves wide angle, high magnification, and high performance through, for example, selection of glass materials and configuration of the lenses in an appropriate manner.

In the zoom lens system disclosed in Japanese Patent Laid-Open No. 2001-183584, variation in axial chromatic aberration during zooming, variation in axial chromatic aberration due to change in object distance, and change in the performance around the telescopic end tend to increase with increase in magnification. Therefore, further improvements in the zoom lens system remain necessary.

SUMMARY OF THE INVENTION

The present disclosure is directed to a zoom lens system including, in order from an object side to an image side, a first lens unit having a positive refractive power that does not move for zooming, a second lens unit having a negative refractive power that moves during zooming, and a third lens unit having a positive refractive power that moves during zooming. In the zoom lens system, a distance between lens units that are adjacent to each other changes during zooming, the first lens unit includes a first a-lens unit that does not move for focusing, and a first b-lens unit that moves from the image side towards the object side during focusing from an infinite distant object to a nearby object, and the first a-lens unit comprises two positive lenses and two negative lenses.

Further features of the present invention will become apparent from the following description of exemplary embodiments with reference to the attached drawings.

BRIEF DESCRIPTION OF THE DRAWINGS

FIG. 1 is a cross-sectional view of a zoom lens system focused to infinity at a wide angle end, according to a first embodiment.

FIGS. 2A and 2B are aberration diagrams of the zoom lens system at a wide angle end and at a telescopic end focused at an object distance of 15 m, according to the first embodiment.

FIGS. 4A and 4B are aberration diagrams of the zoom lens system at a wide angle end and at a telescopic end focused at an object distance of 15 m, according to the second embodiment.

FIG. 5 is a cross-sectional view of a zoom lens system focused to infinity at a wide angle end, according to a third embodiment.

FIGS. 6A and 6B are aberration diagrams of the zoom lens system at a wide angle end and at a telescopic end focused at an object distance of 15 m, according to the third embodiment.

FIGS. 10A and 10B are aberration diagrams of the zoom lens system at a wide angle end and at a telescopic end focused at an object distance of 15 m, according to the fifth embodiment.

DESCRIPTION OF THE EMBODIMENTS

In a positive lead type zoom lens system, in order to obtain a high optical performance throughout the entire zoom and focus range while maintaining a wide view angle and a high magnification, it is important to set the configuration of the first lens unit, the refractive power, and the focus method in an appropriate manner. Without the above configuration being appropriately set, it is difficult to obtain a zoom lens system having a high optical performance with a wide view angle and a high zoom ratio throughout the entire zoom and focus range.

The present disclosure provides a zoom lens system with a wide view angle and a high zoom ratio throughout the entire zoom and focus range while achieving a favorable zooming operation, and an image capturing apparatus including the zoom lens system.

Hereinafter, exemplary embodiments of the present disclosure will be described in detail with reference to the accompanying drawings.

A zoom lens system of the present disclosure includes, in order from the object side to the image side, a first lens unit having a positive refractive power that does not move for zooming, a second lens unit having a negative refractive power that moves during zooming, and a third lens unit having a positive refractive power that moves during zooming.

Herein, the lens unit not moving to zoom means that the lens unit is not moved for the purpose of zooming alone, but when zooming and focusing are performed at the same time, a given lens unit may be moved for focusing.

FIG. 1 is a cross-sectional view of lenses of a first exemplary embodiment (a first numerical embodiment) of the present disclosure focused to infinity at a wide angle end. FIGS. 2A and 2B are aberration diagrams when the lenses at a wide angle end and at a telescopic end, respectively, are focused to a distance of 15 m. Note that the values of the object distances are distances in which the numerical embodiments described later are expressed in millimeters (mm). The object distance is a distance from the first lens surface to the plane (physical location) where the object is located during an imaging operation. The same applies hereinafter to all embodiments.

Figure 3:
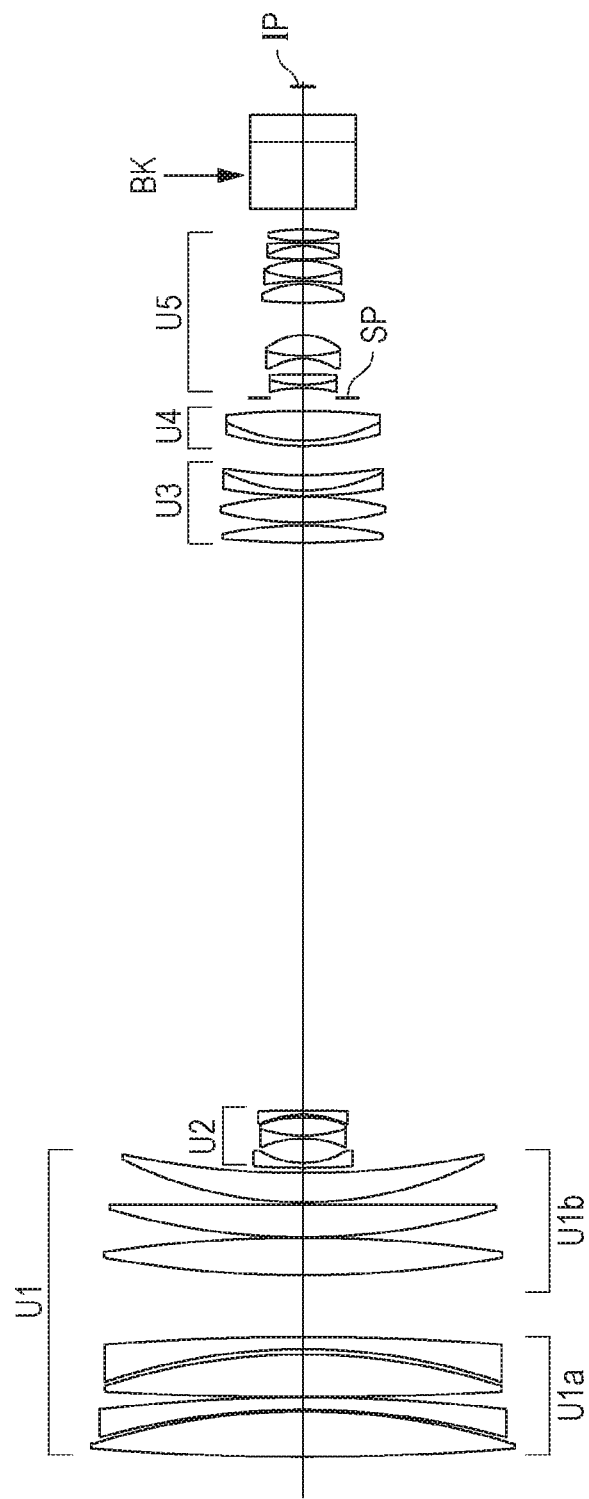
FIG. 3 is a cross-sectional view of a zoom lens system focused to infinity at a wide angle end, according to a second embodiment.

FIG. 3 is a cross-sectional view of lenses of a second exemplary embodiment (a second numerical embodiment) of the present disclosure focused to infinity at a wide angle end. FIGS. 4A and 4B are aberration diagrams when the lenses at a wide angle end and at a telescopic end, respectively, are focused to a distance of 15 m.

FIG. 5 is a cross-sectional view of lenses of a third exemplary embodiment (a third numerical embodiment) of the present disclosure focused to infinity at a wide angle end. FIGS. 6A and 6B are aberration diagrams when the lenses at a wide angle end and at a telescopic end, respectively, are focused to a distance of 15 m.

Figure 7:
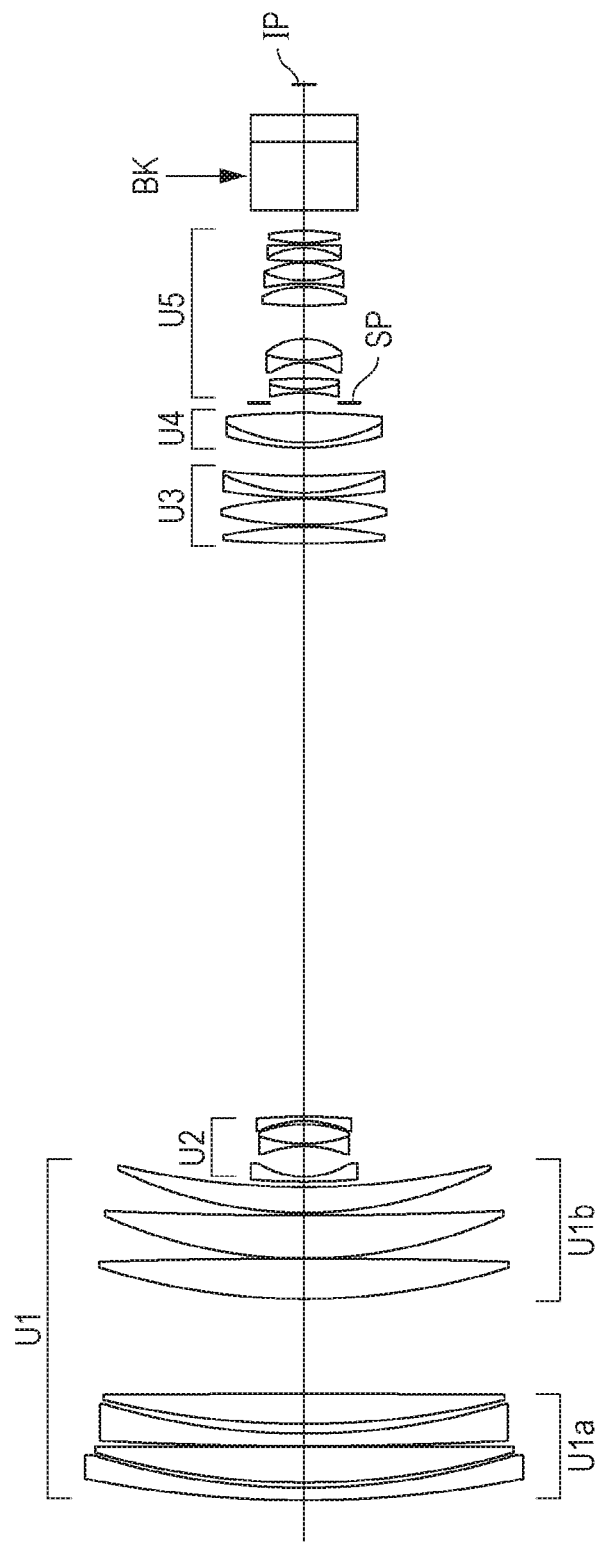
FIG. 7 is a cross-sectional view of a zoom lens system focused to infinity at a wide angle end, according to a fourth embodiment.
Figure 8A:
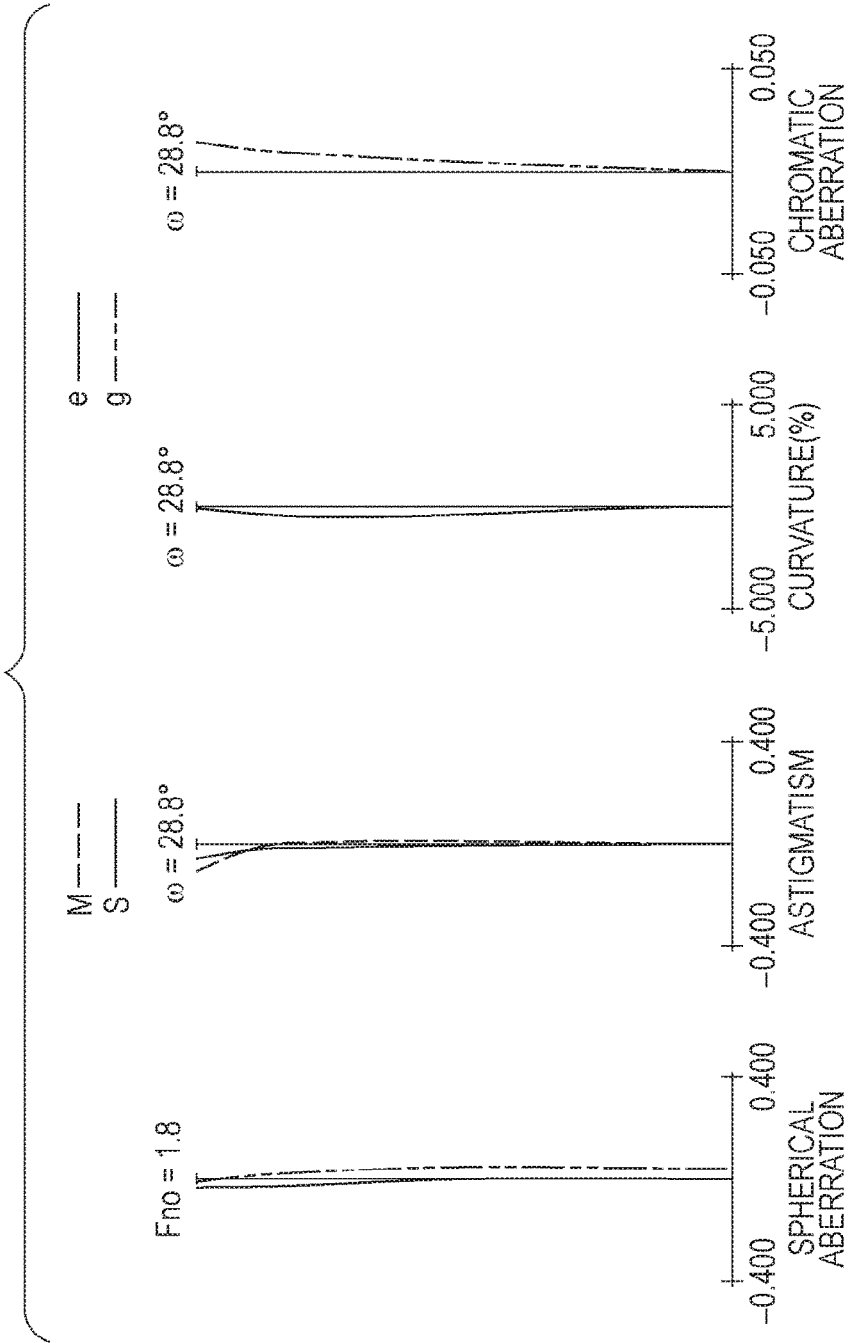
FIGS. 8A and 8B are aberration diagrams of the zoom lens system at a wide angle end and at a telescopic end focused at an object distance of 15 m, according to the fourth embodiment.
Figure 8B:
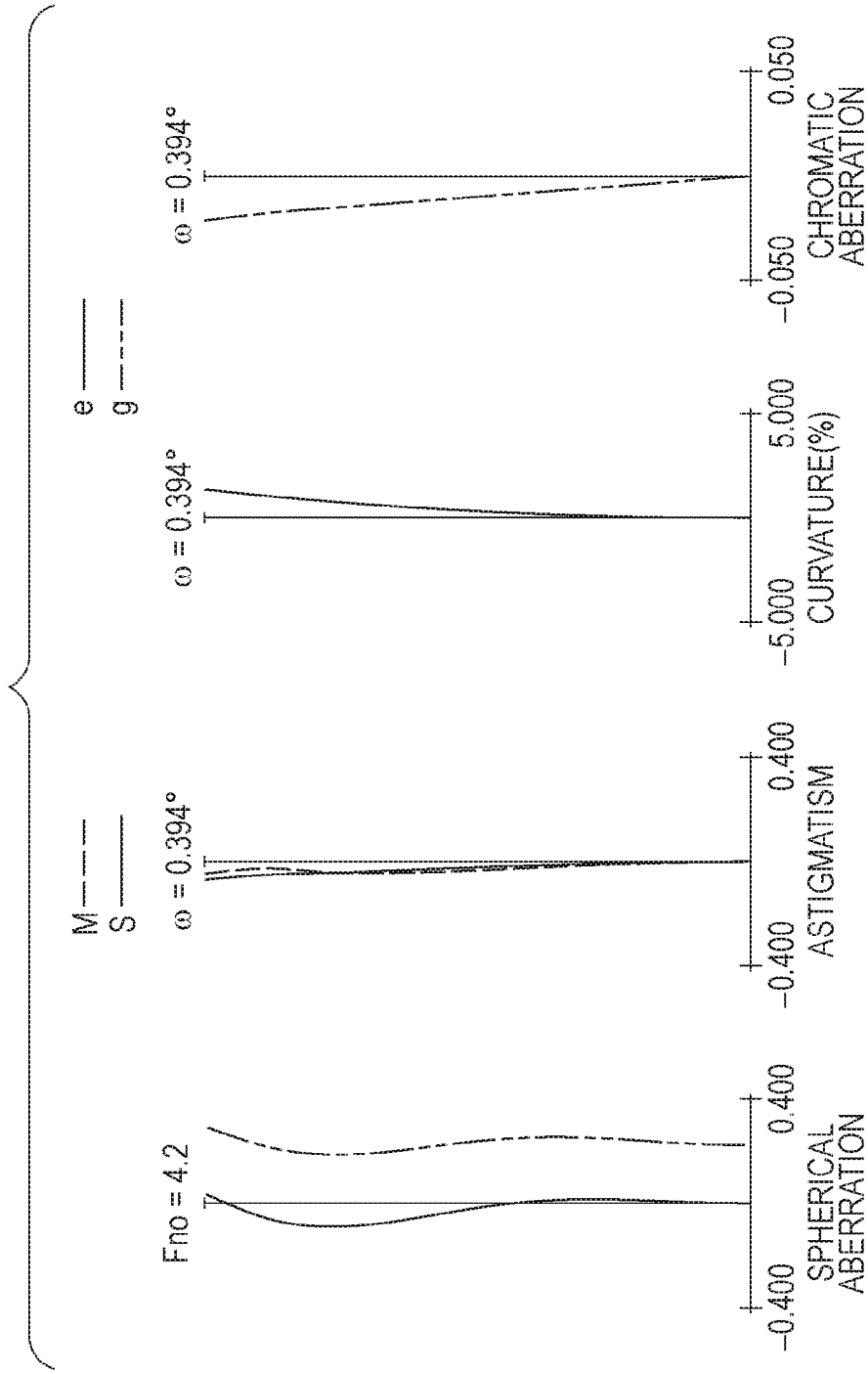

FIG. 7 is a cross-sectional view of lenses of a fourth exemplary embodiment (a fourth numerical embodiment) of the present disclosure focused to infinity at a wide angle end. FIGS. 8A and 8B are aberration diagrams when the lenses at a wide angle end and at a telescopic end, respectively, are focused to a distance of 15 m.

Figure 9:
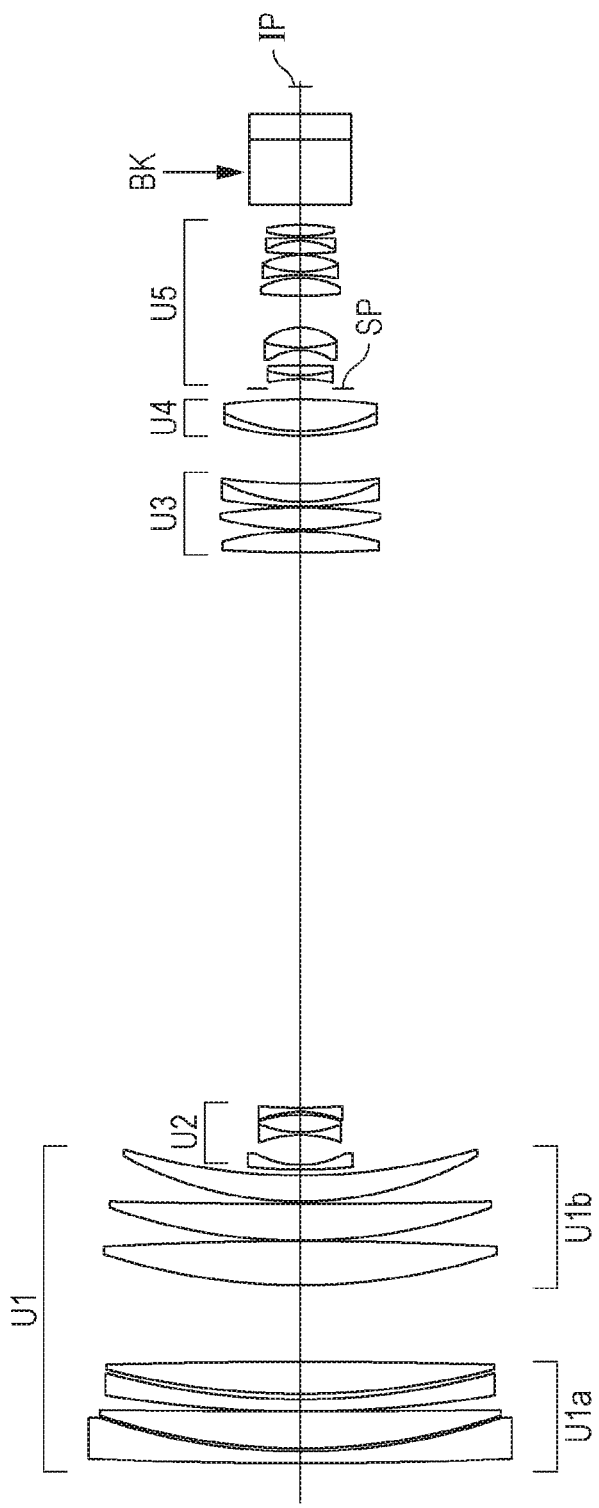
FIG. 9 is a cross-sectional view of a zoom lens system focused to infinity at a wide angle end, according to a fifth embodiment.

FIG. 9 is a cross-sectional view of lenses of a fifth exemplary embodiment (a fifth numerical embodiment) of the present disclosure focused to infinity at a wide angle end. FIGS. 10A and 10B are aberration diagrams when the lenses at a wide angle end and at a telescopic end, respectively, are focused to a distance of 15 m.

In each of the cross-sectional views of the lenses, the left side is the subject (the object) side (the front side) and the right side is the image side (the rear side). In the cross-sectional view of the lenses, reference numeral U1 is the first lens unit having a positive refractive power that does not move for zooming. Reference numeral U1b is a focus lens unit in the first lens unit U1 and moves to the object side when performing focus adjustment from an infinite object to a near object. Reference numeral U1a is a stationary lens unit in the first lens unit U1 and does not move for focusing. Reference numeral U1a denotes a first a-lens unit and reference numeral U1b denotes a b-lens unit in the first lens unit U1.

Reference numeral U2 is the second lens unit having a negative refractive power that moves during zooming. Reference numeral U3 is the third lens unit having a positive refractive power that moves during zooming.

In the first, second, fourth, and fifth exemplary embodiments, reference numeral U4 is the fourth lens unit having a positive refractive power that moves during zooming. Reference numeral U5 is a fifth lens unit (a relay lens unit) for image forming that does not move for zooming. Reference label BK a glass block equivalent to an optical filter or the like.

In the third exemplary embodiment (FIG. 5), reference numeral U4 is a fourth lens unit (a relay lens unit) for image forming that does not move for zooming.

The zoom lens system of each exemplary embodiment performs zooming and correction of the image plane variation associated with zooming by changing each of the lens distances while moving on the optical axis.

Reference numeral IP is an image plane or image surface and corresponds to an image pickup surface of a solid-state image pick up element (photoelectric conversion element), such as a CCD sensor or a CMOS sensor. In each spherical aberration diagram, the solid line represents an e-line and the two-dot chain line represents a g-line. In each astigmatism graph, the dotted line represents a meridional image surface of an e-line, and the solid line represents a sagittal image surface of the e-line. In each chromatic aberration graph, the two-dot chain line represents chromatic aberration of magnification at a g-line. Fno represents an F-number, and ω represents a half angle of view (degree).

In each aberration diagram, the spherical aberration is drawn in a scale of 0.2 mm, the astigmatism in 0.2 mm, the curvature in 5%, and the magnification chromatic aberration in 0.05 mm.

The zoom lens system of the present disclosure specifies conditions for obtaining a high optical performance with a high zoom ratio and a wide view angle throughout the entire zoom and focus range by specifying the focusing system of the first lens and the lens configuration of the first lens unit.

Included in the zoom lens system is, in order from the object side to the image side, the first lens unit having a positive refractive power that does not move for zooming, the second lens unit having a negative refractive power that moves during zooming, and the third lens unit having a positive refractive power that moves during zooming. Furthermore, the distance between adjacent lens units change during zooming, and the first lens unit includes the first a-lens unit that does not move for focusing and the first b-lens unit that moves to the object side from the image side during focusing from an infinite object to a near object. Furthermore, the first a-lens unit is formed of two positive lenses and two negative lenses.

With the configuration described above, a zoom lens system having a high optical performance with a high zoom ratio and a wide view angle, and moreover, a zoom lens system having the above high optical performance throughout the entire zoom and focus range is obtained.

In each exemplary embodiment, the first lens unit includes two lens units, namely, the first a-lens unit on the object side and a first b-lens unit on the image side. The first a-lens unit on the object side does not move for focusing and the first b-lens unit on the image side moves during focusing. When focusing from an infinite object to a near object, focus adjustment is made by moving from the image side to the object side.

In the above case, upon performance of focusing, the height of the axial ray and that of the off axial ray changes and, accordingly, aberration variation occurs. Generally, the aberration variation increases towards the telephoto side. In order to suppress the above, the amount of aberration occurring in the first a-lens unit on the object side that has a large ray height needs to be suppressed. The aberration variation can be classified into chromatic aberration and aberration attributed to a standard wavelength.

The first a-lens unit having two negative lenses and two positive lenses increases the number of lens surfaces in the first a-lens unit and can suppress the amount of aberration occurring on the surfaces in the first a-lens unit. Furthermore, plural combinations of adjoining surfaces (a convexity and a concavity, in the first exemplary embodiment, the second surface and the third surface, and the sixth surface and the seventh surface) that have close curvatures and in which the aberrations are cancelled out with respect to each other can be provided. Since the combinations can correct high order aberrations, by providing plural combinations, the aberrations occurring in the first a-lens unit from a low order aberration to a high order aberration can be corrected in a favorable manner.

Furthermore, while maintaining aberration sensitivity and the optical performance, dispersion (Abbe number νd) of the positive lens and the negative lens can be brought close to each other. Accordingly, related to the selection of the glass materials, the dispersion characteristics (partial dispersion ratios θgf) of the positive lens and the negative lens can be brought close to each other and the chromatic aberration of the first a-lens unit can be corrected in a favorable manner throughout the entire wavelength.

Another feature of the zoom lens system of the present disclosure is that a condition for obtaining a zoom lens system having a high zoom ratio and a wide view angle, moreover, a zoom lens system having a high optical performance throughout the entire zoom and focus range is specified by specifying the configuration of the lenses and the refractive powers of the lens units of the fourth lens unit and after. By configuring the fourth lens unit and after so that the fourth lens unit has a positive refractive power that moves during zooming and that the fifth lens unit is provided for image forming, or so that the fourth lens unit is provided for image forming, high zoom ratio can be achieved while maintaining the total lens length.

Another feature of the zoom lens system of the present disclosure is that the ratio of the focal length of the negative lens of the first a-lens unit and the ratio of dispersion of the lens material thereof are specified. With the above, chromatic aberration and various aberrations of the first a-lens unit can be suppressed from occurring and aberration occurring due to focusing can be favorably corrected.

When the focal length of the negative lens disposed on the object side among the two negative lenses is fn1 and the Abbe number thereof is νn1, and when the focal length of the negative lens disposed on the image side is fn2 and the Abbe number thereof is νn2, the following conditional expressions hold true.

$$0.30 < fn1/fn2 < 2.50 \tag{1}$$

$$0.30 < \nu n1/\nu n2 < 2.70 \tag{2}$$

Note that the Abbe number is expressed by the following equation when the refractive indexes at the F-line (486.1 nm), the d-line (587.6 nm), and the C-line (656.3 nm) of the Fraunhofer lines are Nd, NF, and NC, respectively.

$$\nu d = (Nd-1)/(NF-NC)$$

When under the lower limit of the conditional expression (1), the refractive power of the negative lens disposed on the object side that has a large off axial ray height becomes strong, and the distortion on the wide-angle side and the curvature of the image surface worsen. Furthermore, the sensitivities in the spherical aberration and the like of the first a-lens unit increase. When exceeding the upper limit of the conditional expression (1), the refractive power of the negative lens disposed on the object side becomes weak, and the retrofocusing of the first lens unit will become difficult and reduction in size will become difficult. Furthermore, the refractive power of the negative lens disposed on the image side becomes strong and the spherical aberration and the like of the first a-lens unit increase.

When under the lower limit of the conditional expression (2), the dispersion of the negative lens disposed on the object side that has a large off axial ray height becomes strong and the negative lens disposed on the image side that has a small off axial ray height becomes weak, making it difficult to achieve both corrections of the axial chromatic aberration and the magnification chromatic aberration. When exceeding the upper limit of the conditional expression (2), the dispersion of the negative lens disposed on the object side that has a large off axial ray height becomes weak and the negative lens disposed on the image side that has a small off axial ray height becomes strong, making it difficult to achieve corrections of both the axial chromatic aberration and the magnification chromatic aberration.

More preferably, it is desirable to set the conditional expressions (1) and (2) in the following manner.

$$0.40 < fn1/fn2 < 1.90 \tag{1a}$$

$$0.35 < \nu n1/\nu n2 < 2.50 \tag{2a}$$

As another feature of the zoom lens system of the present disclosure, the condition for suppressing various aberrations of the first a-lens unit from occurring and for favorably correcting the aberration occurring due to focusing is specified by specifying the ratio between the focal length of the negative lens of the first a-lens unit and the focal length of the first lens unit.

When the focal length of the first lens unit is f1, the following conditional expressions hold true.

$$1.30 < |fn1/f1| < 5.00 \tag{3}$$

$$1.50 < |fn2/f1| < 6.00 \tag{4}$$

When under the lower limit of the conditional expression (3), the refractive power of the negative lens disposed on the object side that has a high off axial ray becomes strong, and the distortion on the wide-angle side and the curvature of the image surface worsen. Furthermore, the sensitivities in the spherical aberration and the like of the first a-lens unit increase. When exceeding the upper limit of the conditional expression (3), the refractive power of the negative lens disposed on the object side becomes weak, and it will be difficult to perform retrofocusing of the first lens unit and to achieve reduction in size.

When under the lower limit of the conditional expression (4), the refractive power of the negative lens disposed on the image side becomes strong and the spherical aberration and the like of the first a-lens unit increase. When exceeding the upper limit of the conditional expression (4), the refractive power of the negative lens disposed on the object side becomes weak, making it difficult to favorably correct the chromatic aberration and various aberrations of the first a-lens unit; accordingly, the occurrence of aberration due to focusing increases.

More preferably, it is desirable to set the conditional expressions (3) and (4) in the following manner.

$$1.60 < |fn1/f1| < 4.50 \tag{3a}$$

$$1.70 < |fn2/f1| < 4.70 \tag{4a}$$

As another feature, the zoom lens system of the present disclosure specifies the condition of the dispersion characteristic of the lens material of the first a-lens unit to specify the condition for favorably correcting the variation in the axial chromatic aberration due to focusing, the axial chromatic aberration due to zooming, and the variation in the magnification chromatic aberration.

When the average value of the Abbe number and the average value of the partial dispersion ratio of the positive lenses among the lenses that configure the first a-lens unit are νpa and θpa, respectively, and when the Abbe number and the partial dispersion ratio of the negative lens with the largest Abbe number among the negative lenses that configure the first a-lens unit are νnx and θnx, respectively, the following conditional expression holds true.

$$-0.50500 \times 10^{-3} < (\theta pa - \theta nx)/(\nu pa - \nu nx) < 0.20000 \times 10^{-3} \quad (5)$$

Note that the partial dispersion ratio is expressed by the following expression when the refractive index of the g-line (435.8 nm) of the Fraunhofer line is Ng.

$$\theta = (Ng - NF)/(NF - NC)$$

When under the lower limit of the conditional expression (5), the chromatic aberration correction effect of the first a-lens unit becomes insufficient making it difficult to favorably correct the variation in the axial chromatic aberration due to focusing, the axial chromatic aberration due to zooming, and the variation in the magnification chromatic aberration. When exceeding the upper limit of the conditional expression (5), since the selection of the glass material becomes limited, the dispersions of the positive lens and the negative lens of the first a-lens unit become close to each other and the refractive power of each of the lenses of the first a-lens unit increases. As a result, it is difficult to perform a favorable correction of coma aberration variation due to focusing.

More preferably, it is desirable to set the conditional expression (5) in the following manner.

$$-0.50000 \times 10^{-3} < (\theta pa - \theta nx)/(\nu pa - \nu nx) < 0.100000 \times 10^{-3} \quad (5a)$$

As another feature of the zoom lens system of the present disclosure, the condition for achieving a favorable correction of the aberration throughout the entire zooming range while having high magnification is specified by specifying the focal lengths of the first lens unit and the second lens unit. When the focal length of the second lens unit is f2, the following conditional expression holds true.

$$6.00 < |f1/f2| < 13.00 \quad (6)$$

When exceeding the upper limit of the conditional expression (6), since the focal length of the first lens unit becomes relatively long, the lens diameter of the first lens unit becomes large making it difficult to widen the angle. When under the lower limit of the conditional expression (6), since the focal length of the first lens unit becomes relatively short, it is difficult to correct the spherical aberration variation and the axial chromatic aberration on the telephoto side.

More preferably, it is desirable to set the conditional expression (6) in the following manner.

$$7.50 < |f1/f2| < 11.00 \quad (6a)$$

An another feature of the zoom lens system of the present disclosure is that the ratio between the combined focal length of the negative lenses of the first a-lens unit, the combined focal length of the positive lenses of the first a-lens unit, and the focal length of the first lens unit are specified. With the above, various aberrations of the first a-lens unit are suppressed from occurring and aberration occurring due to focusing can be favorably corrected.

When the combined focal length of the positive lenses among the lenses configuring the first a-lens unit is fpa, the combined focal length of the negative lenses thereof is fna, the following conditional expressions hold true.

$$0.75 < |fna/fpa| < 1.30 \quad (7)$$

$$1.00 < |fna/f1| < 2.00 \quad (8)$$

$$1.00 < |fpa/f1| < 2.20 \quad (9)$$

Note that combined focal length fx of the plurality of lenses is expressed in the following manner when each of the focal length of the plurality of lenses is f1, f2, f3, . . . .

$$1/fx = 1/f1 + 1/f2 + 1/f3 + \ldots$$

When under the lower limit of the conditional expression (7), the refractive power of each of the lenses of the first a-lens unit becomes strong and it is difficult to correct the spherical aberration and the coma aberration at the telescopic end. Furthermore, the sensitivities in the spherical aberration and the like of the first a-lens unit increase. When exceeding the upper limit of the conditional expression (7), achromatization of the first a-lens unit becomes insufficient; accordingly, variation in chromatic aberration due to focusing increases.

When under the lower limit of the conditional expression (8), the refractive power of the negative lens becomes strong, and the distortion on the wide-angle side and the curvature of the image surface worsen. Furthermore, the sensitivities in the spherical aberration and the like of the first a-lens unit increase. When exceeding the upper limit of the conditional expression (8), achromatization of the first a-lens unit becomes insufficient; accordingly, variation in chromatic aberration due to focusing increases.

When under the lower limit of the conditional expression (9), the refractive power of the positive lens becomes strong and it is difficult to correct the spherical aberration and the coma aberration at the telescopic end. Furthermore, the sensitivities in the spherical aberration and the like of the first a-lens unit increase. When exceeding the upper limit of the conditional expression (9), achromatization of the first a-lens unit becomes insufficient; accordingly, variation in chromatic aberration due to focusing increases.

More preferably, it is desirable to set the conditional expressions (7), (8), and (9) in the following manner.

$$0.85 < |fna/fpa| < 1.10 \quad (7a)$$

$$1.10 < |fna/f1| < 1.70 \quad (8a)$$

$$1.10 < |fpa/f1| < 1.90 \quad (9a)$$

Description of each of the exemplary embodiments will be given next.

First Exemplary Embodiment

In the cross-sectional view of lenses of a first exemplary embodiment in FIG. 1, reference numeral U1 is a first lens unit having a positive refractive power that does not move for zooming. The first lens unit U1 includes, in the order from the object side to the image side, a first a-lens unit U1a that does not move for focusing, and a first b-lens unit U1b that moves during focusing. When focusing a near object from an infinite object, the first b-lens unit U1b for focusing moves towards the object side as the object distance changes from long distance to short distance.

Reference numeral U2 and U3 are a second lens unit having a negative refractive power and a third lens unit (a variator lens unit) having a positive refractive power, respectively, that move during zooming. The second lens unit U2 and the third lens unit U3 perform magnification from a wide angle end to a telescopic end by moving on the optical axis. Reference numeral U4 is a fourth lens unit (a compensator lens unit) having a positive refractive power that moves during zooming. The fourth lens unit U4 moves on the optical axis while interlocking with the movement of the second and third lens units U2 and U3 and corrects the image plane variation associated with the magnification. Reference numeral SP is an aperture diaphragm. Reference numeral U5 is a fifth lens unit (a relay lens unit R) having a positive refractive power that does not move during zooming. The aperture diaphragm SP is disposed between the fourth lens unit U4 and the fifth lens unit U5.

The present exemplary embodiment satisfies each of the conditional expressions (1) to (9); accordingly, a zoom lens system with a high zoom ratio and a high performance, and, moreover, with little degradation in performance caused by manufacturing error can be obtained.

Second Exemplary Embodiment

A zoom lens system of a second exemplary embodiment in FIG. 3 has a zoom type, such as the number of lens unit, the refractive power of each lens unit, and the condition in which each lens unit move while focusing, that is similar to that of the first exemplary embodiment.

The present exemplary embodiment satisfies each of the conditional expressions; accordingly, the advantageous effects that are the same as those of the first exemplary embodiment are obtained.

Third Exemplary Embodiment

In the cross-sectional view of the lenses of a third exemplary embodiment in FIG. 5, reference numeral U1 is a first lens unit having a positive refractive power that does not move for zooming. The first lens unit U1 includes, in the order from the object side to the image side, a first a-lens unit U1a that does not move for focusing, and a first b-lens unit U1b that moves during focusing. When focusing a near object from an infinite object, the first b-lens unit U1b for focusing moves towards the object side as the object distance changes from long distance to short distance.

Reference numeral U2 is a second lens unit (a compensator lens unit) having a positive refractive power that moves during zooming. The second lens unit U2 performs magnification from a wide angle end to a telescopic end by moving on the optical axis. Reference numeral U3 is a third lens unit (a compensator lens unit) having a positive refractive power that moves during zooming. The third lens unit U3 moves on the optical axis while interlocking with the movement of the second lens unit U2 and corrects the image plane variation associated with the magnification. Reference numeral SP is an aperture diaphragm. Reference numeral U4 is a fourth lens unit (a relay lens unit R) having a positive refractive power that is stationary during zooming. The aperture diaphragm SP is disposed between the third lens unit U3 and the fourth lens unit U4.

The present exemplary embodiment satisfies each of the conditional expressions (1) to (9); accordingly, a zoom lens system with a high zoom ratio and a high performance, and, moreover, with little degradation in performance caused by manufacturing error can be obtained.

Fourth Exemplary Embodiment

A zoom lens system of a fourth exemplary embodiment in FIG. 7 has a zoom type, such as the number of lens unit, the refractive power of each lens unit, and the condition in which each lens unit move while focusing, that is similar to that of the first exemplary embodiment.

The present exemplary embodiment satisfies each of the conditional expressions; accordingly, the advantageous effects that are the same as those of the first exemplary embodiment are obtained.

Fifth Exemplary Embodiment

A zoom lens system of a fifth exemplary embodiment in FIG. 9 has a zoom type, such as the number of lens unit, the refractive power of each lens unit, and the condition in which each lens unit move while focusing, that is the same as that of the first exemplary embodiment.

The present exemplary embodiment satisfies each of the conditional expressions; accordingly, the advantageous effects that are the same as those of the first exemplary embodiment are obtained.

Furthermore, the first a-lens unit U1a, which does not move for focusing, of the first lens unit U1 of each exemplary embodiment may have an aspherical surface. When focusing, the first b-lens unit U1b of each exemplary embodiment may integrally move as a whole to the object side or may move in a composite manner as two separate members.

Sixth Exemplary Embodiment

Figure 11:
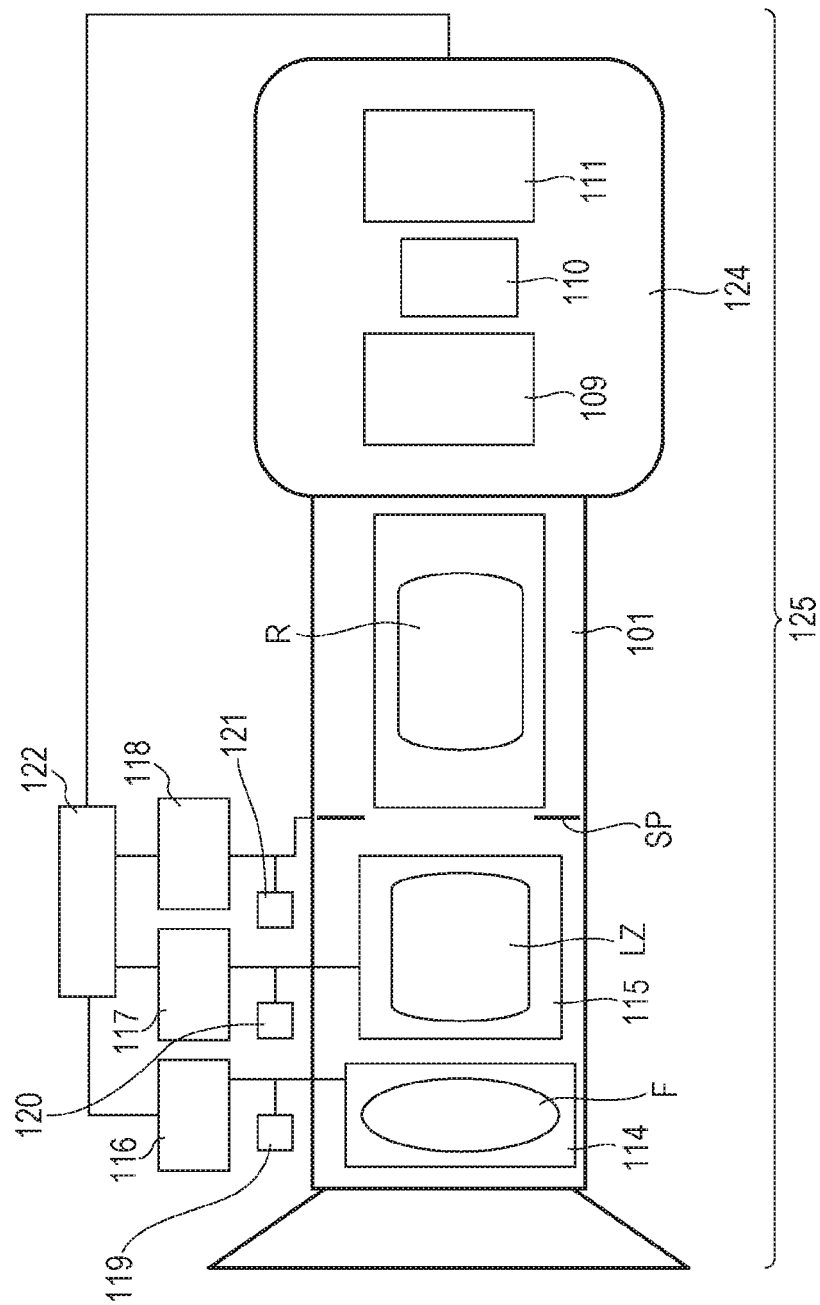
FIG. 11 is a schematic diagram of an image capturing apparatus including a zoom lens system of the present disclosure.

Referring to FIG. 11, an outline of an image capturing apparatus (a television camera system), serving as an image-capturing optical system, employing the zoom lens system of any one of the numerical embodiments will be described. FIG. 11 is a schematic diagram illustrating an essential portion of the image capturing apparatus of the present disclosure. In FIG. 11, reference numeral 101 is the zoom lens system of either one of the first to fifth numerical embodiments. Reference numeral 124 is a camera. The zoom lens system 101 is detachable with respect to the camera 124. Reference numeral 125 is the image capturing apparatus configured by mounting the zoom lens system 101 on the camera 124.

The zoom lens system 101 includes a first lens unit F, a magnification lens unit LZ, and a rear lens unit R. The first lens unit F includes a lens unit for focus adjustment. The magnification lens unit LZ includes a unit that moves on the optical axis during zooming and a unit that moves on the optical axis for correcting the image plane variation associated with zooming. The rear lens R includes an aperture diaphragm SP and a lens unit for image forming.

Reference numerals 114 and 115 are drive mechanisms, such as a helicoid or a cam structures, that drive the first lens unit F and the magnification lens unit LZ in the optical axis direction. Reference numerals 116, 117 to 118 are motors (driving devices) that electrically drive the drive mechanisms 114 and 115 and the aperture diaphragm SP. Reference numerals 119, 120 to 121 are detectors, such as an encoder, a potentiometer, or a photosensor, for detecting the positions of the first lens unit F and the magnification lens unit LZ on the optical axis and the aperture diameter of the aperture diaphragm SP.

In the camera 124, reference numeral 109 is a glass block equivalent to an optical filter or a color split prism inside the camera 124, reference numeral 110 is a solid-state image pick up element (a photoelectric conversion element) such as a CCD sensor or a CMOS sensor that photo receives the subject image formed by the zoom lens system 101. Furthermore, reference numerals 111 and 122 are CPUs that control the various drive of the camera 124 and a zoom lens system body 101.

By applying the zoom lens system of the present disclosure to a television camera in the above manner, an image capturing apparatus having a high optical performance is provided.

Hereinafter, first to fifth numerical embodiments corresponding to the first to fifth exemplary embodiment of the disclosure will be illustrated. In each of the numerical embodiments, surface number i represents the number of the surface from the object side, ri represents the curvature radius of the $i^{th}$ surface from the object side, di represents the distance between the $i^{th}$ and the $i+1^{th}$ surfaces from the object side, and ndi and vdi represent the refractive index and the Abbe number of the $i^{th}$ optical member. BF represents a back focus. When X-shaft represents a direction of the optical axis, H-shaft represents a direction perpendicular to the optical axis, the direction in which the light proceeds is positive, and R represents a paraxial curvature radius, k represents a conic constant, and A4, A6, A8, A10, A12, A14, and A16 are each an aspherical coefficient, the aspherical surface shape is expressed by the following equation.

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16}$$

Furthermore, a notation in the form "e-Z" denotes an exponential notation in the form "$\times 10^{-Z}$", and a surface number marked with an asterisk "*" represents an aspherical surface. The correspondence between each exemplary embodiment and the conditional expressions described above is illustrated in Table 1.

First Numerical Embodiment

Unit: mm
Surface Data
Surface Number r d nd vd θgF Effective Aperture Focal Length
1 1997.02113 6.00000 1.788001 47.37 0.5559 198.149 −452.598
2 303.49132 1.94485 1.000000 0.00 0.0000 190.591 0.000
3 317.22604 19.16858 1.433870 95.10 0.5373 190.378 698.448
4 −7044.93390 0.20000 1.000000 0.00 0.0000 190.784 0.000
5 673.24372 6.00000 1.834000 37.16 0.5775 192.043 −1014.711
6 374.48011 0.79177 1.000000 0.00 0.0000 191.537 0.000
7 345.92209 19.79827 1.433870 95.10 0.5373 192.283 687.598
8 −2170.21310 28.23869 1.000000 0.00 0.0000 192.596 0.000
9 339.68529 21.07732 1.433870 95.10 0.5373 195.863 648.526
10 −1632.16760 0.25000 1.000000 0.00 0.0000 195.374 0.000
11 246.79128 21.92714 1.433870 95.10 0.5373 190.003 593.790
12 5400.98293 1.20000 1.000000 0.00 0.0000 188.452 0.000
13 187.53643 11.51644 1.496999 81.54 0.5374 175.330 938.176
14 306.70197 (Variable) 1.000000 0.00 0.0000 173.621 0.000
15 395.90619 2.35000 1.882997 40.76 0.5667 51.597 −55.978
16 44.04654 13.30679 1.000000 0.00 0.0000 44.829 0.000
17 −65.41206 1.45000 1.772499 49.60 0.5521 42.284 −42.531
18 67.29545 9.26401 1.808095 22.76 0.6307 42.341 44.835
19 −75.29841 3.29682 1.000000 0.00 0.0000 43.030 0.000
20 −53.59756 2.00000 1.696797 55.53 0.5433 42.991 −78.730
21 −2003.54268 (Variable) 1.000000 0.00 0.0000 45.165 0.000
22 628.44661 9.76339 1.603112 60.64 0.5414 75.695 208.575
23 −157.12389 1.60214 1.000000 0.00 0.0000 77.204 0.000
24 221.58939 13.83425 1.438750 94.93 0.5343 79.745 201.114
25 −144.43270 10.00142 1.000000 0.00 0.0000 80.024 0.000
26 −1008.20057 2.50000 1.717362 29.50 0.6048 77.517 −124.649
27 99.08580 9.31604 1.438750 94.93 0.5343 76.804 258.044
28 757.73674 (Variable) 1.000000 0.00 0.0000 77.029 0.000
29 142.05929 14.10652 1.593490 67.00 0.5361 78.216 127.579
30 −157.32117 (Variable) 1.000000 0.00 0.0000 77.818 0.000
31 0.00000 4.90749 1.000000 0.00 0.0000 33.177 0.000
32 −72.13544 1.80000 1.816000 46.62 0.5568 31.587 −39.850
33 60.43089 5.13557 1.808095 22.76 0.6307 31.258 59.455
34 −237.28216 7.55722 1.000000 0.00 0.0000 31.109 0.000
35 −28.78125 1.49977 1.816000 46.62 0.5568 30.305 −24.953
36 72.49578 10.08032 1.548141 45.79 0.5685 33.631 38.544
37 −28.55262 16.01812 1.000000 0.00 0.0000 34.930 0.000
38 194.31854 9.07524 1.531717 48.84 0.5630 38.345 68.490
39 −44.35136 1.49161 1.000000 0.00 0.0000 38.448 0.000
40 −104.49421 1.50000 1.882997 40.76 0.5667 36.218 −38.029
41 50.24421 8.69548 1.518229 58.90 0.5456 35.615 45.865
42 −42.76309 0.49453 1.000000 0.00 0.0000 35.713 0.000
43 151.55145 6.51018 1.496999 81.54 0.5374 33.550 59.851
44 −36.61436 1.50000 1.882997 40.76 0.5667 32.980 −44.960
45 −449.26887 1.00055 1.000000 0.00 0.0000 32.726 0.000
46 79.39231 5.73260 1.522494 59.84 0.5439 32.255 83.857
47 −96.19591 10.00000 1.000000 0.00 0.0000 31.572 0.000
48 0.00000 33.00000 1.608590 46.44 0.5664 40.000 0.000
49 0.00000 13.20000 1.516330 64.14 0.5352 40.000 0.000
50 0.00000 0.00000 1.000000 0.00 0.0000 50.000 0.000
Aspherical Surface Data
Fifteenth Surface
K=−2.45811e+002 A 4=1.07978e−006 A 6=−4.50940e−010 A 8=1.73915e−013
Twenty-Second Surface
K=−5.09046e+001 A 4=−2.37327e−007 A 6=3.54000e−012 A 8=−1.42314e−015
Various Data
Zoom Ratio 80.00
Wide Angle Intermediate Telephoto
Focal Length 10.00 89.41 800.00
F-Number 1.80 1.80 4.20
Field Angle 28.81 3.52 0.39

Image Height 5.50 5.50 5.50
Total Lens Length 691.51 691.51 691.51
BF 14.63 14.63 14.63
d14 3.00 139.64 177.80
d21 289.00 115.12 2.88
d28 1.43 2.92 3.32
d30 13.35 49.10 122.78
d50 14.63 14.63 14.63
Position of Entrance Pupil 155.45 1014.32 10584.39
Position of Exit Pupil 11004.69 11004.69 11004.69
Front Principal Point Position 165.46 1104.46 11442.62
Rear Principal Point Position 4.63 −74.78 −785.37
Zoom Lens Unit Data
Unit Starting Surface Focal Length Lens Structure Length
Front Principal Point Position Rear Principal Point Position
1 1 246.00 138.11 81.41 −19.51
2 15 −28.50 31.67 7.77 −14.80
3 22 161.40 47.02 −4.26 −37.12
4 29 127.58 14.11 4.27 −4.73
5 31 60.37 139.20 60.71 7.60

Second Numerical Embodiment

Unit: mm
Surface Data
Surface Number r d nd vd θgF Effective Aperture Focal Length
1 1324.80625 22.32362 1.433870 95.10 0.5373 201.749 619.788
2 −336.72584 0.79968 1.000000 0.00 0.0000 199.468 0.000
3 −370.74012 6.00000 1.834000 37.16 0.5775 194.541 −789.254
4 −848.15632 0.20000 1.000000 0.00 0.0000 190.376 0.000
5 1733.64369 20.94068 1.433870 95.10 0.5373 189.840 607.866
6 −310.83471 2.61864 1.000000 0.00 0.0000 189.561 0.000
7 −298.28647 6.00000 1.772499 49.60 0.5521 188.690 −503.149
8 −1273.75329 30.35525 1.000000 0.00 0.0000 189.954 0.000
9 548.82791 18.46581 1.433870 95.10 0.5373 190.391 701.589
10 −680.33731 0.25000 1.000000 0.00 0.0000 190.046 0.000
11 333.29911 15.97422 1.433870 95.10 0.5373 184.668 765.659
12 −408110.84046 1.20000 1.000000 0.00 0.0000 183.614 0.000
13 194.97395 14.30085 1.496999 81.54 0.5374 172.382 709.696
14 423.79760 (Variable) 1.000000 0.00 0.0000 170.447 0.000
15 419.69996 2.35000 1.882997 40.76 0.5667 47.312 −50.297
16 40.26779 11.98920 1.000000 0.00 0.0000 40.789 0.000
17 −50.83937 1.45000 1.772499 49.60 0.5521 38.920 −36.992
18 66.79636 9.04244 1.808095 22.76 0.6307 39.334 40.318
19 −60.94881 1.28069 1.000000 0.00 0.0000 40.183 0.000
20 −49.90479 2.00000 1.696797 55.53 0.5433 40.190 −79.704
21 −481.89320 (Variable) 1.000000 0.00 0.0000 42.279 0.000
22 337.49438 8.60231 1.603112 60.64 0.5414 76.190 194.359
23 −178.94751 1.35642 1.000000 0.00 0.0000 76.928 0.000
24 164.89680 12.68381 1.438750 94.93 0.5343 78.861 193.472
25 −171.72108 0.46460 1.000000 0.00 0.0000 78.786 0.000
26 233.46660 2.50000 1.749505 35.33 0.5818 76.772 −186.036
27 87.25934 7.72445 1.438750 94.93 0.5343 74.595 306.167
28 241.16096 (Variable) 1.000000 0.00 0.0000 74.275 0.000
29 122.51081 2.50000 1.846660 23.78 0.6205 73.869 −292.057
30 81.41636 14.66930 1.593490 67.00 0.5361 72.165 112.042
31 −345.13967 (Variable) 1.000000 0.00 0.0000 71.183 0.000
32 0.00000 4.90749 1.000000 0.00 0.0000 33.126 0.000
33 −72.13544 1.80000 1.816000 46.62 0.5568 31.551 −39.850
34 60.43089 5.13557 1.808095 22.76 0.6307 31.235 59.455
35 −237.28216 7.55722 1.000000 0.00 0.0000 31.092 0.000
36 −28.78125 1.49977 1.816000 46.62 0.5568 30.304 −24.953
37 72.49578 10.08032 1.548141 45.79 0.5685 33.646 38.544
38 −28.55262 16.01812 1.000000 0.00 0.0000 34.946 0.000
39 194.31854 9.07524 1.531717 48.84 0.5630 38.448 68.490
40 −44.35136 1.49161 1.000000 0.00 0.0000 38.557 0.000
41 −104.49421 1.50000 1.882997 40.76 0.5667 36.327 −38.029
42 50.24421 8.69548 1.518229 58.90 0.5456 35.729 45.865
43 −42.76309 0.49453 1.000000 0.00 0.0000 35.828 0.000
44 151.55145 6.51018 1.496999 81.54 0.5374 33.663 59.851
45 −36.61436 1.50000 1.882997 40.76 0.5667 33.109 −44.960
46 −449.26887 1.00055 1.000000 0.00 0.0000 32.863 0.000
47 79.39231 5.73260 1.522494 59.84 0.5439 32.401 83.605
48 −95.55050 10.00000 1.000000 0.00 0.0000 31.731 0.000
49 0.00000 33.00000 1.608590 46.44 0.5664 40.000 0.000
50 0.00000 13.20000 1.516330 64.14 0.5352 40.000 0.000
51 0.00000 0.00000 1.000000 0.00 0.0000 50.000 0.000
Aspherical Surface Data
Fifteenth Surface
K=−5.20835e+002 A 4=1.54343e−006 A 6=−1.02554e−009 A 8=6.38836e−013
Twenty-Second Surface
K=−2.95240e+001 A 4=−7.87902e−008 A 6=−6.79761e−012 A 8=7.47662e−016
Various Data
Zoom Ratio 80.00
Wide Angle Intermediate Telephoto
Focal Length 10.00 89.40 800.00
F-Number 1.80 1.80 4.20
Field Angle 28.81 3.52 0.39
Image Height 5.50 5.50 5.50
Total Lens Length 674.53 674.53 674.53
BF 14.95 14.95 14.95
d14 2.65 136.33 174.96
d21 279.09 112.65 11.29
d28 14.34 7.83 1.48
d31 6.25 45.53 114.60
d51 14.95 14.95 14.95
Position of Entrance Pupil 161.62 1023.49 10527.82
Position of Exit Pupil 7811.22 7811.22 7811.22
Front Principal Point Position 171.63 1113.91 11409.91
Rear Principal Point Position 4.95 −74.45 −785.04
Zoom Lens Unit Data Unit Starting Surface Focal Length Lens Structure Length Front Principal Point Position Rear Principal Point Position
1 1 247.00 139.43 80.62 −27.10
2 15 −27.02 28.11 5.99 −14.22
3 22 120.36 33.33 2.96 −19.39
4 29 182.76 17.17 2.55 −8.14
5 32 60.14 139.20 60.60 7.42

Third Numerical Embodiment

Unit: mm
Surface Data
Surface Number r d nd vd θgF Effective Aperture Focal Length
1 −5040.51292 6.00000 1.717004 47.92 0.5606 210.375 −565.252
2 443.32592 0.99823 1.000000 0.00 0.0000 203.264 0.000
3 432.21379 13.24440 1.433870 95.10 0.5373 202.957 1229.522
4 2232.40054 0.20000 1.000000 0.00 0.0000 201.877 0.000
5 597.02189 6.00000 1.850259 32.27 0.5929 199.277 −970.826
6 345.89840 2.30196 1.000000 0.00 0.0000 194.872 0.000
7 356.45839 25.67725 1.433870 95.10 0.5373 194.500 521.917
8 −611.48487 44.12339 1.000000 0.00 0.0000 193.447 0.000
9 332.28960 19.88688 1.433870 95.10 0.5373 194.591 716.228
10 −4896.15184 0.25000 1.000000 0.00 0.0000 193.840 0.000
11 312.99644 17.65657 1.433870 95.10 0.5373 189.613 746.308
12 8595.88869 1.20000 1.000000 0.00 0.0000 188.310 0.000
13 175.20052 14.81483 1.496999 81.54 0.5374 175.289 774.124
14 311.88029 (Variable) 1.000000 0.00 0.0000 172.719 0.000
15 664.85120 2.35000 1.882997 40.76 0.5667 48.085 −50.572
16 42.00306 11.20017 1.000000 0.00 0.0000 41.784 0.000
17 −53.72304 1.45000 1.772499 49.60 0.5521 40.770 −36.234
18 59.72156 10.77698 1.808095 22.76 0.6307 43.957 43.022
19 −78.36637 0.86621 1.000000 0.00 0.0000 45.167 0.000
20 −70.23718 2.00000 1.696797 55.53 0.5433 45.250 −121.151
21 −414.26158 (Variable) 1.000000 0.00 0.0000 47.209 0.000
22 212.31031 13.23565 1.603112 60.64 0.5414 79.327 133.849
23 −127.99792 0.20000 1.000000 0.00 0.0000 80.182 0.000
24 97.94547 14.21573 1.438750 94.93 0.5343 80.057 199.096
25 −790.29143 0.20000 1.000000 0.00 0.0000 78.777 0.000
26 260.22473 2.30685 1.805181 25.42 0.6161 76.974 −138.957
27 78.43639 10.85321 1.438750 94.93 0.5343 73.695 208.062
28 525.57155 1.48047 1.000000 0.00 0.0000 73.072 0.000
29 214.97173 6.65950 1.593490 67.00 0.5361 72.271 300.536
30 −1057.43892 (Variable) 1.000000 0.00 0.0000 71.430 0.000
31 0.00000 4.54925 1.000000 0.00 0.0000 34.330 0.000
32 −94.68231 1.80000 1.816000 46.62 0.5568 32.768 −40.722
33 52.04362 5.73792 1.808095 22.76 0.6307 32.171 59.938
34 −778.81851 7.60591 1.000000 0.00 0.0000 31.862 0.000
35 −28.66765 1.49977 1.816000 46.62 0.5568 31.165 −27.013
36 99.82643 9.78155 1.548141 45.79 0.5685 34.570 41.833
37 −28.92570 16.01920 1.000000 0.00 0.0000 35.816 0.000
38 199.34821 6.70092 1.531717 48.84 0.5630 38.819 70.702
39 −46.06345 1.49225 1.000000 0.00 0.0000 38.842 0.000
40 −100.22501 1.50000 1.882997 40.76 0.5667 36.719 −38.292
41 51.83775 8.48732 1.518229 58.90 0.5456 36.172 48.039
42 −45.56870 1.00004 1.000000 0.00 0.0000 36.281 0.000
43 143.58790 8.50167 1.496999 81.54 0.5374 34.219 60.624
44 −37.51907 1.50000 1.882997 40.76 0.5667 33.064 −45.656
45 −511.58948 1.00125 1.000000 0.00 0.0000 32.878 0.000
46 74.36478 5.81334 1.522494 59.84 0.5439 32.490 78.431
47 −89.61862 10.00000 1.000000 0.00 0.0000 31.878 0.000
48 0.00000 33.00000 1.608590 46.44 0.5664 40.000 0.000
49 0.00000 13.20000 1.516330 64.14 0.5352 40.000 0.000
50 0.00000 0.00000 1.000000 0.00 0.0000 50.000 0.000
Aspherical Surface Data
Fifteenth Surface
K=−9.17148e+002 A4=8.97349e−007 A6=−3.36416e−010 A8=8.18022e−014
Twenty-Second Surface
K=−5.34644e+000 A4=−1.44820e−007 A6=6.38150e−012 A8=2.42371e−016
Various Data
Zoom Ratio 80.00
Wide Angle Intermediate Telephoto
Focal Length 10.00 89.43 800.00
F-Number 1.79 1.80 4.20
Field Angle 28.81 3.52 0.39
Image Height 5.50 5.50 5.50
Total Lens Length 677.58 677.58 677.58
BF 14.94 14.94 14.94
d14 3.00 140.38 178.51
d21 284.99 114.84 3.16
d30 5.30 38.07 111.62
d50 14.94 14.94 14.94
Position of Entrance Pupil 166.55 990.97 9682.89
Position of Exit Pupil −2390.11 −2390.11 −2390.11
Front Principal Point Position 176.50 1077.08 10216.78
Rear Principal Point Position 4.94 −74.49 −785.06
Zoom Lens Unit Data
Unit Starting Surface Focal Length Lens Structure Length Front Principal Point Position Rear Principal Point Position
1 1 247.00 152.35 94.45 −20.43
2 15 −29.86 28.64 4.81 −15.77
3 22 77.98 49.15 9.69 −24.48
4 31 63.69 139.19 62.04 7.12

Fourth Numerical Embodiment

Unit: mm
Surface Data
Surface Number r d nd vd θgF Effective Aperture Focal Length
1 540.51891 6.00000 1.854780 24.80 0.6122 204.916 −1023.079
2 333.53068 2.44610 1.000000 0.00 0.0000 197.511 0.000

3 354.54790 17.42717 1.433870 95.10 0.5373 196.541 812.102
4 −93758.76385 0.20000 1.000000 0.00 0.0000 194.228 0.000
5 1909.26865 6.00000 1.639999 60.08 0.5370 191.536 −620.926
6 329.60361 4.69068 1.000000 0.00 0.0000 187.583 0.000
7 407.56060 14.50916 1.433870 95.10 0.5373 188.171 907.832
8 −12544.99821 45.79065 1.000000 0.00 0.0000 188.323 0.000
9 326.40246 19.33977 1.433870 95.10 0.5373 192.153 685.684
10 −3395.16984 0.25000 1.000000 0.00 0.0000 191.653 0.000
11 234.85405 20.84581 1.433870 95.10 0.5373 186.846 602.215
12 2210.13952 1.20000 1.000000 0.00 0.0000 185.428 0.000
13 202.41101 12.37011 1.496999 81.54 0.5374 174.594 840.897
14 383.48455 (Variable) 1.000000 0.00 0.0000 172.897 0.000
15 457.43359 2.35000 1.882997 40.76 0.5667 49.711 −50.888
16 41.03229 14.54481 1.000000 0.00 0.0000 42.871 0.000
17 −55.72869 1.45000 1.772499 49.60 0.5521 39.618 −39.753
18 69.92511 9.21164 1.808095 22.76 0.6307 40.991 42.019
19 −63.35971 1.69693 1.000000 0.00 0.0000 41.800 0.000
20 −48.05236 2.00000 1.696797 55.53 0.5433 41.801 −82.817
21 −286.06046 (Variable) 1.000000 0.00 0.0000 44.111 0.000
22 374.72769 8.00938 1.603112 60.64 0.5414 74.990 204.605
23 −183.57781 0.98756 1.000000 0.00 0.0000 75.711 0.000
24 168.50932 12.54292 1.438750 94.93 0.5343 77.680 190.177
25 −162.33229 0.51071 1.000000 0.00 0.0000 77.670 0.000
26 225.78128 2.50000 1.749505 35.33 0.5818 75.771 −202.099
27 90.58423 8.02203 1.438750 94.93 0.5343 73.805 285.347
28 316.71179 (Variable) 1.000000 0.00 0.0000 73.472 0.000
29 125.63978 2.50000 1.846660 23.78 0.6205 72.702 −262.011
30 79.75788 14.23865 1.593490 67.00 0.5361 70.895 111.450
31 −369.39822 (Variable) 1.000000 0.00 0.0000 69.910 0.000
32 0.00000 4.90749 1.000000 0.00 0.0000 33.144 0.000
33 −72.13544 1.80000 1.816000 46.62 0.5568 31.569 −39.850
34 60.43089 5.13557 1.808095 22.76 0.6307 31.252 59.455
35 −237.28216 7.55722 1.000000 0.00 0.0000 31.109 0.000
36 −28.78125 1.49977 1.816000 46.62 0.5568 30.321 −24.953
37 72.49578 10.08032 1.548141 45.79 0.5685 33.671 38.544
38 −28.55262 16.01812 1.000000 0.00 0.0000 34.966 0.000
39 194.31854 9.07524 1.531717 48.84 0.5630 38.490 68.490
40 −44.35136 1.49161 1.000000 0.00 0.0000 38.601 0.000
41 −104.49421 1.50000 1.882997 40.76 0.5667 36.367 −38.029
42 50.24421 8.69548 1.518229 58.90 0.5456 35.769 45.865
43 −42.76309 0.49453 1.000000 0.00 0.0000 35.868 0.000
44 151.55145 6.51018 1.496999 81.54 0.5374 33.699 59.851
45 −36.61436 1.50000 1.882997 40.76 0.5667 33.149 −44.960
46 −449.26887 1.00055 1.000000 0.00 0.0000 32.904 0.000
47 79.39231 5.73260 1.522494 59.84 0.5439 32.441 83.644
48 −95.65061 10.00000 1.000000 0.00 0.0000 31.774 0.000
49 0.00000 33.00000 1.608590 46.44 0.5664 40.000 0.000
50 0.00000 13.20000 1.516330 64.14 0.5352 40.000 0.000
51 0.00000 0.00000 1.000000 0.00 0.0000 50.000 0.000

Aspherical Surface Data
Fifteenth Surface
K=−5.67078e+002 A4=1.45820e−006 A6=−8.19984e−010 A8=4.57496e−013
Twenty-Second Surface
K=−2.72744e+001 A4=−1.02316e−007 A6=−2.24758e−012 A8=−1.15884e−016

Various Data
Zoom Ratio 80.00
Wide Angle Intermediate Telephoto
Focal Length 10.00 89.46 800.00
F-Number 1.80 1.80 4.20
Field Angle 28.81 3.52 0.39
Image Height 5.50 5.50 5.50
Total Lens Length 683.42 683.42 683.42
BF 14.96 14.96 14.96
d14 2.65 136.75 177.42
d21 276.48 107.28 4.73
d28 13.66 9.62 8.25
d31 4.83 43.97 107.23
d51 14.96 14.96 14.96
Position of Entrance Pupil 172.72 994.11 10385.21
Position of Exit Pupil 8182.06 8182.06 8182.06
Front Principal Point Position 182.73 1084.54 11263.57
Rear Principal Point Position 4.96 −74.49 −785.03

Zoom Lens Unit Data
Unit Starting Surface Focal Length Lens Structure Length Front Principal Point Position Rear Principal Point Position
1 1 247.00 151.07 96.10 −23.17
2 15 −27.89 31.25 6.69 −16.09
3 22 114.48 32.57 4.01 −17.95
4 29 194.98 16.74 2.39 −8.02
5 32 60.17 139.20 60.62 7.45

Fifth Numerical Embodiment

Unit: mm
Surface Data
Surface Number r d nd vd θgF Effective Aperture Focal Length
1 2436.20797 6.00000 1.639999 60.08 0.5370 207.998 −549.495
2 308.08263 1.60986 1.000000 0.00 0.0000 198.320 0.000
3 314.66392 18.64663 1.433870 95.10 0.5373 197.902 760.546
4 6332.28838 0.20000 1.000000 0.00 0.0000 196.364 0.000
5 603.08886 6.00000 1.854780 24.80 0.6122 192.014 −1102.556
6 367.40990 2.72065 1.000000 0.00 0.0000 190.412 0.000
7 393.10907 16.12824 1.433870 95.10 0.5373 190.991 816.634
8 −3637.88082 38.93074 1.000000 0.00 0.0000 191.144 0.000
9 321.03306 22.28825 1.433870 95.10 0.5373 193.803 627.474

10 −1782.98914 0.25000 1.000000 0.00 0.0000 193.066 0.000
11 285.32034 18.64551 1.433870 95.10 0.5373 187.904 706.555
12 3906.23867 1.20000 1.000000 0.00 0.0000 186.366 0.000
13 183.98953 13.15182 1.496999 81.54 0.5374 174.012 896.076
14 305.43046 (Variable) 1.000000 0.00 0.0000 171.437 0.000
15 370.39834 2.35000 1.882997 40.76 0.5667 51.444 −61.390
16 47.38567 15.03937 1.000000 0.00 0.0000 44.955 0.000
17 −60.04212 1.45000 1.772499 49.60 0.5521 40.012 −36.883
18 55.29844 8.83280 1.808095 22.76 0.6307 39.213 39.663
19 −72.53083 1.58631 1.000000 0.00 0.0000 39.352 0.000
20 −52.23934 2.00000 1.696797 55.53 0.5433 39.307 −64.902
21 353.26772 (Variable) 1.000000 0.00 0.0000 41.065 0.000
22 557.43254 10.67333 1.603112 60.64 0.5414 75.688 198.321
23 −151.94456 0.94219 1.000000 0.00 0.0000 77.124 0.000
24 156.10343 11.08587 1.438750 94.93 0.5343 79.115 225.538
25 −266.26098 0.45930 1.000000 0.00 0.0000 79.005 0.000
26 221.02580 2.50000 1.749505 35.33 0.5818 77.728 −182.001
27 84.28843 9.18283 1.438750 94.93 0.5343 75.648 260.668
28 307.64854 (Variable) 1.000000 0.00 0.0000 75.386 0.000
29 126.06342 2.50000 1.846660 23.78 0.6205 75.169 −316.687
30 85.23121 16.00701 1.593490 67.00 0.5361 73.603 112.475
31 −291.09108 (Variable) 1.000000 0.00 0.0000 72.500 0.000
32 0.00000 4.90749 1.000000 0.00 0.0000 33.107 0.000
33 −72.13544 1.80000 1.816000 46.62 0.5568 31.542 −39.850
34 60.43089 5.13557 1.808095 22.76 0.6307 31.235 59.455
35 −237.28216 7.55722 1.000000 0.00 0.0000 31.097 0.000
36 −28.78125 1.49977 1.816000 46.62 0.5568 30.322 −24.953
37 72.49578 10.08032 1.548141 45.79 0.5685 33.684 38.544
38 −28.55262 16.01812 1.000000 0.00 0.0000 34.979 0.000
39 194.31854 9.07524 1.531717 48.84 0.5630 38.558 68.490
40 −44.35136 1.49161 1.000000 0.00 0.0000 38.674 0.000
41 −104.49421 1.50000 1.882997 40.76 0.5667 36.439 −38.029
42 50.24421 8.69548 1.518229 58.90 0.5456 35.845 45.865
43 −42.76309 0.49453 1.000000 0.00 0.0000 35.944 0.000
44 151.55145 6.51018 1.496999 81.54 0.5374 33.774 59.851
45 −36.61436 1.50000 1.882997 40.76 0.5667 33.233 −44.960
46 −449.26887 1.00055 1.000000 0.00 0.0000 32.994 0.000
47 79.39231 5.73260 1.522494 59.84 0.5439 32.536 83.505
48 −95.29566 10.00000 1.000000 0.00 0.0000 31.877 0.000
49 0.00000 33.00000 1.608590 46.44 0.5664 40.000 0.000
50 0.00000 13.20000 1.516330 64.14 0.5352 40.000 0.000
51 0.00000 0.00000 1.000000 0.00 0.0000 50.000 0.000

Aspherical Surface Data
Fifteenth Surface
K=−2.83227e+002 A 4=1.27013e−006 A 6=−5.69599e−010 A 8=3.15356e−013
Twenty-Second Surface
K=−1.31199e+002 A 4=−2.47168e−008 A 6=−1.51931e−011 A 8=2.47286e−015

Various Data
Zoom Ratio 80.00

|  | Wide Angle | Intermediate | Telephoto |
|---|---|---|---|
| Focal Length | 10.00 | 89.42 | 800.00 |
| F-Number | 1.80 | 1.80 | 4.20 |
| Field Angle | 28.81 | 3.52 | 0.39 |
| Image Height | 5.50 | 5.50 | 5.50 |
| Total Lens Length | 698.44 | 698.44 | 698.44 |
| BF | 15.16 | 15.16 | 15.16 |
| d14 | 3.00 | 143.45 | 181.96 |
| d21 | 281.16 | 115.58 | 14.93 |
| d28 | 24.13 | 7.35 | 1.48 |
| d31 | 5.41 | 47.33 | 115.33 |
| d51 | 15.16 | 15.16 | 15.16 |
| Position of Entrance Pupil | 166.83 | 1085.00 | 10843.19 |
| Position of Exit Pupil | 6999.93 | 6999.93 | 6999.93 |
| Front Principal Point Position | 176.84 | 1175.57 | 11734.82 |
| Rear Principal Point Position | 5.16 | −74.26 | −784.84 |

Zoom Lens Unit Data
Unit Starting Surface Focal Length Lens Structure Length Front Principal Point Position Rear Principal Point Position
1 1 252.00 145.77 88.51 −22.57
2 15 −26.50 31.26 9.25 −12.90
3 22 126.28 34.84 3.87 −19.27
4 29 174.93 18.51 3.37 −8.21
5 32 60.04 139.20 60.56 7.35

TABLE 1

| Conditional Expression Number | Conditional Expression | First Numerical Embodiment | Second Numerical Embodiment | Third Numerical Embodiment | Fourth Numerical Embodiment | Fifth Numerical Embodiment |
|---|---|---|---|---|---|---|
| (1) | fn1/fn2 | 0.45 | 1.57 | 0.58 | 1.65 | 0.50 |
| (2) | vn1/vn2 | 1.27 | 0.75 | 1.48 | 0.41 | 2.42 |
| (3) | |fn1/f1| | 1.84 | 3.20 | 2.29 | 4.14 | 2.18 |
| (4) | |fn2/f1| | 4.12 | 2.04 | 3.93 | 2.51 | 4.38 |
| (5) | (θpa − θnx)/(vpa − vnx) | −0.00039 | −0.00032 | −0.00049 | 0.00001 | 0.00001 |
| (6) | |f1/f2| | 8.63 | 9.14 | 8.27 | 8.86 | 9.51 |
| (7) | |fna/fpa| | 0.90 | 1.00 | 0.98 | 0.90 | 0.93 |
| (8) | |fna/f1| | 1.27 | 1.24 | 1.45 | 1.56 | 1.46 |
| (9) | |fpa/f1| | 1.41 | 1.24 | 1.48 | 1.74 | 1.56 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-081063, filed Apr. 10, 2015, which is hereby incorporated by reference herein in its entirety.

What is claimed is:

1. A zoom lens system comprising:
in order from an object side to an image side,
a first lens unit having a positive refractive power that does not move for zooming;
a second lens unit having a negative refractive power that moves during zooming; and
a third lens unit having a positive refractive power that moves during zooming, wherein
a distance between lens units that are adjacent to each other changes during zooming,
the first lens unit consisting of a first a-lens unit that does not move for focusing, and a first b-lens unit that moves from the image side towards the object side during focusing from an infinite object to a near object, and
the first a-lens unit comprises two positive lenses and two negative lenses,
wherein
the following condition is satisfied:

$7.50 < |f1/f2| < 11.00$, where f1 is a focal length of the first lens unit, and f2 is a focal length of the second lens unit.

2. The zoom lens system according to claim 1, wherein from the object side to the image side, the zoom lens system includes the first lens unit, the second lens unit, the third lens unit, a fourth lens unit having a positive refractive power that moves during zooming, and a fifth lens unit that does not move for zooming.

3. The zoom lens system according to claim 1, wherein from the object side to the image side, the zoom lens system includes the first lens unit, the second lens unit, the third lens unit, a fourth lens unit that does not move for zooming.

4. The zoom lens system according to claim 1, wherein the following conditions are satisfied:

$0.30 < fn1/fn2 < 2.50$ $0.30 < vn1/vn2 < 2.70$, where fn1 is a focal length of a negative lens disposed on the object side of the first lens unit, among the two negative lenses of the first a-lens unit, and vn1 is an Abbe number thereof, and
where fn2 is a focal length of a negative lens disposed on the image side, among the two negative lenses of the first a-lens unit, and vn2 is an Abbe number thereof, while the Abbe number is expressed by the following equation:

$vd = (Nd-1)/(NF-NC)$, where NF is a refractive index at an F-line, Nd is a refractive index at a d-line, and NC is a refractive index at a C-line.

5. The zoom lens system according to claim 1, wherein the following conditions are satisfied:

$1.30 < |fn1/f1| < 5.00$ $1.50 < |fn2/f1| < 6.00$, where fn1 is a focal length of a negative lens disposed on the object side of the first lens unit, among the two negative lenses of the first a-lens unit, fn2 is a focal length of a negative lens disposed on the image side, among the two negative lenses of the first a-lens unit, and f1 is a focal length of the first lens unit.

6. The zoom lens system according to claim 1, wherein the following condition is satisfied:

$-0.50500 \times 10^{-3} < (\theta pa - \theta nx)/(vpa - vnx) < 0.20000 \times 10^{-3}$ where vpa and θpa are an average value of the Abbe number and an average value of the partial dispersion ratio, respectively, of the positive lenses among the lenses included in the first a-lens unit, and vnx and θnx are an Abbe number and a partial dispersion ratio, respectively, of a negative lens, among the negative lenses included in the first a-lens unit, that has the largest Abbe number,
while the Abbe number and the partial dispersion ratio are expressed by the following equations:

$vd = (Nd-1)/(NF-NC)$ $\theta = (Ng-NF)/(NF-NC)$, where NF is a refractive index at an F-line, Nd is a refractive index at a d-line, NC is a refractive index at a C-line, and Ng is a refractive index at a g-line.

7. The zoom lens system according to claim 1, wherein the following conditions are satisfied:

$0.75 < |fna/fpa| < 1.30$ $1.00 < |fna/f1| < 2.00$ $1.00 < |fpa/f1| < 2.20$, where f1 is a focal length of the first lens unit, fpa is a combined focal length of the positive lenses that are included in the first a-lens unit, and fna is a combined focal length of the negative lenses included in the first a-lens unit.

8. An image capturing apparatus comprising:
a zoom lens system; and
a solid-state image pick up element that photo receives an image formed by the zoom lens system,
wherein
the zoom lens system comprises
in order from an object side to an image side,
a first lens unit having a positive refractive power that does not move for zooming,
a second lens unit having a negative refractive power that moves during zooming, and
a third lens unit having a positive refractive power that moves during zooming,
wherein
a distance between lens units that are adjacent to each other changes during zooming,
the first lens unit consisting of a first a-lens unit that does not move for focusing, and a first b-lens unit that moves from the image side towards the object side during focusing from an infinite object to a near object, and
the first a-lens unit comprises two positive lenses and two negative lenses
wherein
the following condition is satisfied:

$7.50 < |f1/f2| < 11.00$, where f1 is a focal length of the first lens unit, and f2 is a focal length of the second lens unit.

* * * * *